(12) United States Patent
Komatsu et al.

(10) Patent No.: US 9,231,280 B2
(45) Date of Patent: Jan. 5, 2016

(54) POWER STORAGE APPARATUS AND ELECTRIC VEHICLE

(75) Inventors: Yoshihiro Komatsu, Kanagawa (JP); Hidekazu Kikuchi, Kanagawa (JP); Koji Umetsu, Miyagi (JP); Naoyuki Sugeno, Fukushima (JP); Morihiko Sato, Kanagawa (JP)

(73) Assignee: Sony Corporation, Tokyo (JP)

( * ) Notice: Subject to any disclaimer, the term of this patent is extended or adjusted under 35 U.S.C. 154(b) by 15 days.

(21) Appl. No.: 13/598,936

(22) Filed: Aug. 30, 2012

(65) Prior Publication Data

US 2013/0059182 A1 Mar. 7, 2013

(30) Foreign Application Priority Data

Aug. 31, 2011 (JP) ................................ 2011-189562
Mar. 19, 2012 (JP) ................................ 2012-062257

(51) Int. Cl.

| H01M 10/48 | (2006.01) |
|---|---|
| H01M 10/42 | (2006.01) |
| H01M 2/10 | (2006.01) |
| B60L 1/00 | (2006.01) |
| B60L 11/18 | (2006.01) |

(52) U.S. Cl.
CPC ............ *H01M 10/4207* (2013.01); *B60L 1/00* (2013.01); *B60L 11/1866* (2013.01); *B60L 11/1879* (2013.01); *H01M 2/1072* (2013.01); *H01M 10/482* (2013.01); *H01M 2010/4278* (2013.01); *H01M 2220/20* (2013.01); *Y02T 10/7005* (2013.01); *Y02T 10/7061* (2013.01); *Y02T 90/16* (2013.01)

(58) Field of Classification Search
None
See application file for complete search history.

(56) References Cited

U.S. PATENT DOCUMENTS

| 8,049,509 B2 | 11/2011 | Sakurai et al. |
| 2006/0015219 A1 | 1/2006 | Kynast et al. |
| 2006/0152190 A1* | 7/2006 | Riemschneider ............. 320/106 |
| 2006/0250233 A1* | 11/2006 | Powell et al. ............... 340/539.1 |
| 2008/0012529 A1* | 1/2008 | Chang et al. ................... 320/116 |
| 2008/0309288 A1* | 12/2008 | Benckenstein et al. ........ 320/119 |
| 2009/0144001 A1* | 6/2009 | Leonard et al. ................ 702/63 |
| 2009/0210736 A1* | 8/2009 | Goff et al. ..................... 713/340 |
| 2010/0190041 A1* | 7/2010 | Hou et al. ....................... 429/50 |
| 2011/0089897 A1* | 4/2011 | Zhang et al. .................. 320/116 |
| 2011/0140671 A1* | 6/2011 | Kim et al. ..................... 320/137 |

(Continued)

FOREIGN PATENT DOCUMENTS

| CN | 102047492 A | 5/2011 |
| EP | 2211193 A1 | 7/2010 |

(Continued)

OTHER PUBLICATIONS

Lee et al., Wireless Battery Area Network (WiBaAN) for Smart Battery Management System, U.S. Appl. No. 61/409,290, filed Nov. 2, 2010.*

(Continued)

*Primary Examiner* — Patrick Ryan
*Assistant Examiner* — Jose Colucci Rios
(74) *Attorney, Agent, or Firm* — Sony Corporation

(57) ABSTRACT

A power storage apparatus, electric device, electric vehicle, and power system are disclosed. In an example embodiment, a power storage apparatus includes a battery block comprising a plurality of battery cells and an isolating unit that enables wireless information transfer regarding battery information of the battery block.

27 Claims, 33 Drawing Sheets

(56) References Cited

U.S. PATENT DOCUMENTS

| | | | | |
|---|---|---|---|---|
| 2011/0298417 A1* | 12/2011 | Stewart et al. | | 320/107 |
| 2011/0301890 A1* | 12/2011 | Shirriff et al. | | 702/63 |
| 2012/0217971 A1* | 8/2012 | Deluca | | 324/426 |
| 2013/0271072 A1* | 10/2013 | Lee et al. | | 320/108 |

FOREIGN PATENT DOCUMENTS

| | | |
|---|---|---|
| EP | 2302724 | 3/2011 |
| JP | 08-096105 A | 4/1996 |
| JP | 2000-224770 A | 8/2000 |
| JP | 2001-025174 | 1/2001 |
| JP | 2004-071243 A | 3/2004 |
| JP | 2004-364467 A | 12/2004 |
| JP | 2005-135762 A | 5/2005 |
| JP | 2006-050785 | 2/2006 |
| JP | 2008-090863 | 4/2008 |
| JP | 2009-538112 | 10/2009 |
| JP | 2010-081716 | 4/2010 |
| JP | 2010-081756 | 4/2010 |

OTHER PUBLICATIONS

U.S. Appl. No. 61/409,290, Lee et al., filed Nov. 2, 2010.*
Extended European Search report issued in connection with European Patent Application No. 12006020.7, dated May 28, 2014. (7 pages).
Chinese Office Action issued on Jul. 28, 2015 in patent application No. 201210306916.0.

* cited by examiner

23

23

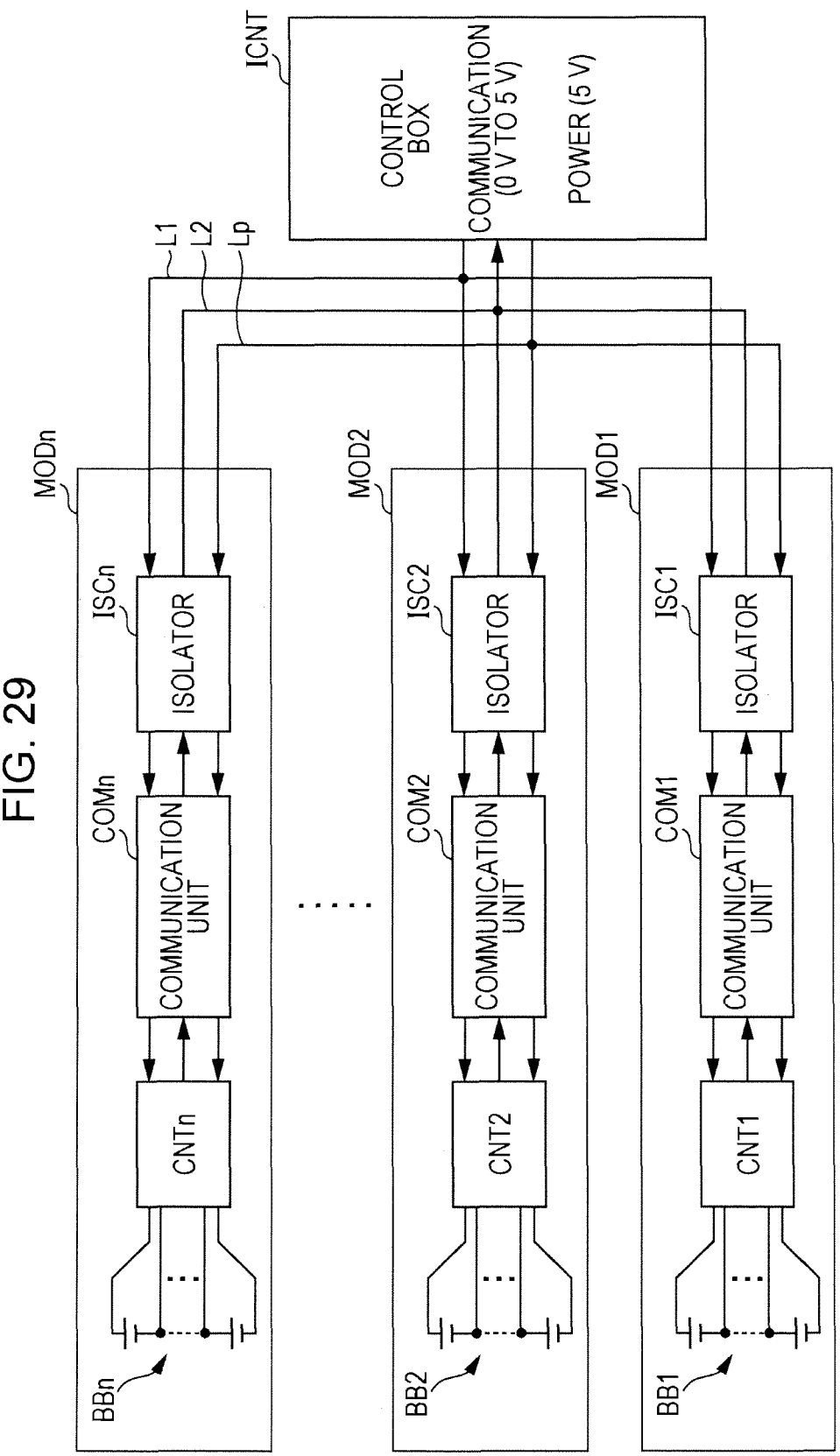

POWER STORAGE APPARATUS AND ELECTRIC VEHICLE

CROSS REFERENCES TO RELATED APPLICATIONS

The present disclosure contains subject matter related to that disclosed in Japanese Priority Patent Application JP 2011-189562 filed in the Japan Patent Office on Aug. 31, 2011 and Japanese Priority Patent Application JP 2012-062257 filed in the Japan Patent Office on Mar. 19, 2012, the entire contents of which are hereby incorporated by reference.

BACKGROUND

The present disclosure relates to a power storage apparatus as well as to an electric vehicle that utilizes power from a power storage apparatus.

Recently, secondary batteries such as lithium-ion batteries have been rapidly expanding to applications such as storage batteries for automobiles and power storage apparatus in which secondary batteries are combined with an alternative energy system such as solar cells or wind turbines. In the case of using a large number of storage elements such as unit cells (also called electrical cells or simply cells, and designated battery cells as appropriate in the following description) in order to produce a large output, a configuration is adopted in which a plurality of storage modules are connected in series. A storage module contains battery blocks in which a plurality of battery cells (four, for example) are connected in parallel and/or in series. A large number of battery blocks are enclosed in an outer case to form a storage module (also called an assembled battery).

There also exists a battery system in which a plurality of storage modules are connected, and in which a control apparatus shared by the plurality of storage modules is provided. Each storage module includes a module controller, with communication between the module controllers and the control apparatus realized via a communication unit or other means.

In the case of using a plurality of battery cells, in some cases one of the plurality of battery cells will reach the low-voltage threshold even though other battery cells have not yet reached the low-voltage threshold, due to factors such as differences in self-discharge among the battery cells. If the battery cells are once again charged in such a state, a problem occurs in that a battery cell may not be sufficiently charged, and battery cell performance may not be sufficiently exhibited.

In order to compensate for such disparities among plural battery cells, battery cell balancing is typically conducted. Controlling cell balancing involves acquiring voltage information for a plurality of battery cells. Japanese Unexamined Patent Application Publication No. 2010-081756 describes a configuration for acquiring battery information from a battery cell.

SUMMARY

In the case of connecting a plurality of storage modules in series, balancing of the modules is conducted. Since differences in power expenditure by a control circuit connected to each storage module are a factor that can disrupt module balance, it is preferable to not use power from the battery pack of storage modules as the power for the control circuits. Furthermore, since the voltage from a serial connection becomes very high in the case of connecting a plurality of storage modules in series, isolation is desired for safety, and in addition, circuit blocks able to operate at low voltages, such as a communication unit and a controller, preferably operate using a low-voltage power supply.

The configuration described in Japanese Unexamined Patent Application Publication No. 2010-081756 above is for acquiring battery information from single battery cells, and does not make considerations for the acquisition of voltage information from individual storage modules in the case of outputting a high voltage, such as in the case where a plurality of storage modules are connected in series.

Consequently, it is desirable to provide a power storage apparatus and an electric vehicle suitable for acquiring voltage information from individual storage modules in the case where a plurality of storage modules are connected in series.

Disclosed herein is a power storage apparatus that includes a plurality of battery units each including a single battery cell, a plurality of battery cells, or a plurality of battery blocks, a monitor configured to acquire the respective voltages of the batteries in the battery units, a communication unit configured to transmit information on the voltages from the monitor to a managing unit configured to manage the battery units, and an isolating transmission unit, disposed in an isolating state between the monitor and the communication unit, and configured to communicate the voltage information while also supplying the monitor with power and monitor control information from the communication unit.

Also disclosed herein is a power storage apparatus that includes a plurality of battery units each including a single battery cell, a plurality of battery cells, or a plurality of battery blocks, a monitor configured to acquire the respective voltages of the batteries in the battery units, a communication unit configured to transmit information on the voltages from the monitor to a managing unit configured to manage the battery units, and an isolating transmission unit, connected in an isolating state to the output side of the communication unit, and configured to communicate the voltage information while also supplying the communication unit with power from the managing unit.

Also disclosed herein is an electric vehicle that includes a conversion apparatus configured to receive power supplied from a power storage apparatus and convert received power into drive for the vehicle, and a control apparatus configured to perform information processing related to vehicle control on the basis of information regarding the power storage apparatus. The power storage apparatus includes a plurality of battery units each including a single battery cell, a plurality of battery cells, or a plurality of battery blocks, a monitor configured to acquire the respective voltages of the batteries in the battery units, a communication unit configured to transmit information on the voltages from the monitor to a managing unit configured to manage the battery units, and an isolating transmission unit, disposed in an isolating state between the monitor and the communication unit, and configured to communicate the voltage information while also supplying the monitor with power and monitor control information from the communication unit.

In an embodiment, a power storage apparatus includes a battery block comprising a plurality of battery cells and an isolating unit that enables wireless information transfer regarding battery information of the battery block. In this embodiment, the isolating unit may include a first card unit and a second card unit being configured for a contactless smart card protocol to facilitate the wireless information transfer, the first and second card units configured to transmit the battery information wirelessly to each other. Additionally, the isolating unit can include a first antenna mounted on a first trace layer of a printed circuit board and electrically connected to the first card unit and a second antenna mounted on a second trace layer of the printed circuit board and electrically connected to the second card unit, the second antenna being directionally aligned with the first antenna to enable the wireless information transfer of battery information between the first and second antennas.

In another embodiment, a power storage system includes a first storage module including a first battery block comprising a first plurality of battery cells and a first isolating unit that enables wireless information transfer regarding battery information of the first battery block. In this other embodiment, the power storage system also includes a second storage module including a second battery block comprising a second plurality of battery cells and a second isolating unit that enables wireless information transfer regarding battery information of the second battery block. Additionally, in this embodiment, battery information of the first storage module is aggregated with battery information from the second storage module.

In yet another embodiment, a power storage control apparatus includes a battery block comprising a plurality of battery cells, a controller configured to measure battery information of the battery block, and an isolating unit that enables wireless communication with the controller and wirelessly transmits power to the controller.

In a further embodiment, a power storage apparatus to power a vehicle includes a plurality of storage modules, each storage module including at least one battery block comprising a plurality of battery cells a controller configured to measure battery information of the at least one battery block, and an isolating unit that enables wireless communication with the controller and wirelessly transmits power to the controller. In this embodiment, the power storage apparatus to power the vehicle also includes an electrical load including an electronic transmission or a motor of a vehicle, the electrical load receiving power from an aggregate of power from the plurality of storage modules.

In a module balancing circuit of the disclosure, flyback transformers in each module are constructed separately, thus enabling simplified wiring without wiring in a star pattern, unlike configurations that share a magnetic core. In the disclosure, the primary switches and the secondary switches of the flyback transformers can be controlled by independent control pulse signals. Consequently, it becomes possible to transmit power via a desired plurality of flyback transformers. Furthermore, by setting the length of the on-periods during switching operation, the amounts of power to move via the flyback transformers can be individually controlled. In other words, the amount of power to move can be varied by lengthening the period during which a switch is switched on in accordance with the amount of power to move.

Additional features and advantages are described herein, and will be apparent from the following Detailed Description and the figures.

BRIEF DESCRIPTION OF THE FIGURES

FIG. 29 is a block diagram illustrating a second example of a configuration of a storage system connecting a plurality of storage modules.

DETAILED DESCRIPTION

Embodiments of the present application will be described below in detail with reference to the drawings.

Storage System

In the case of using a large number of storage elements such as battery cells in order to produce a large output, a configuration is adopted in which a plurality of storage units (hereinafter designated storage modules) are connected, and in which a control apparatus shared by the plurality of storage modules is provided. Such a configuration is designated storage system.

Figure 1:
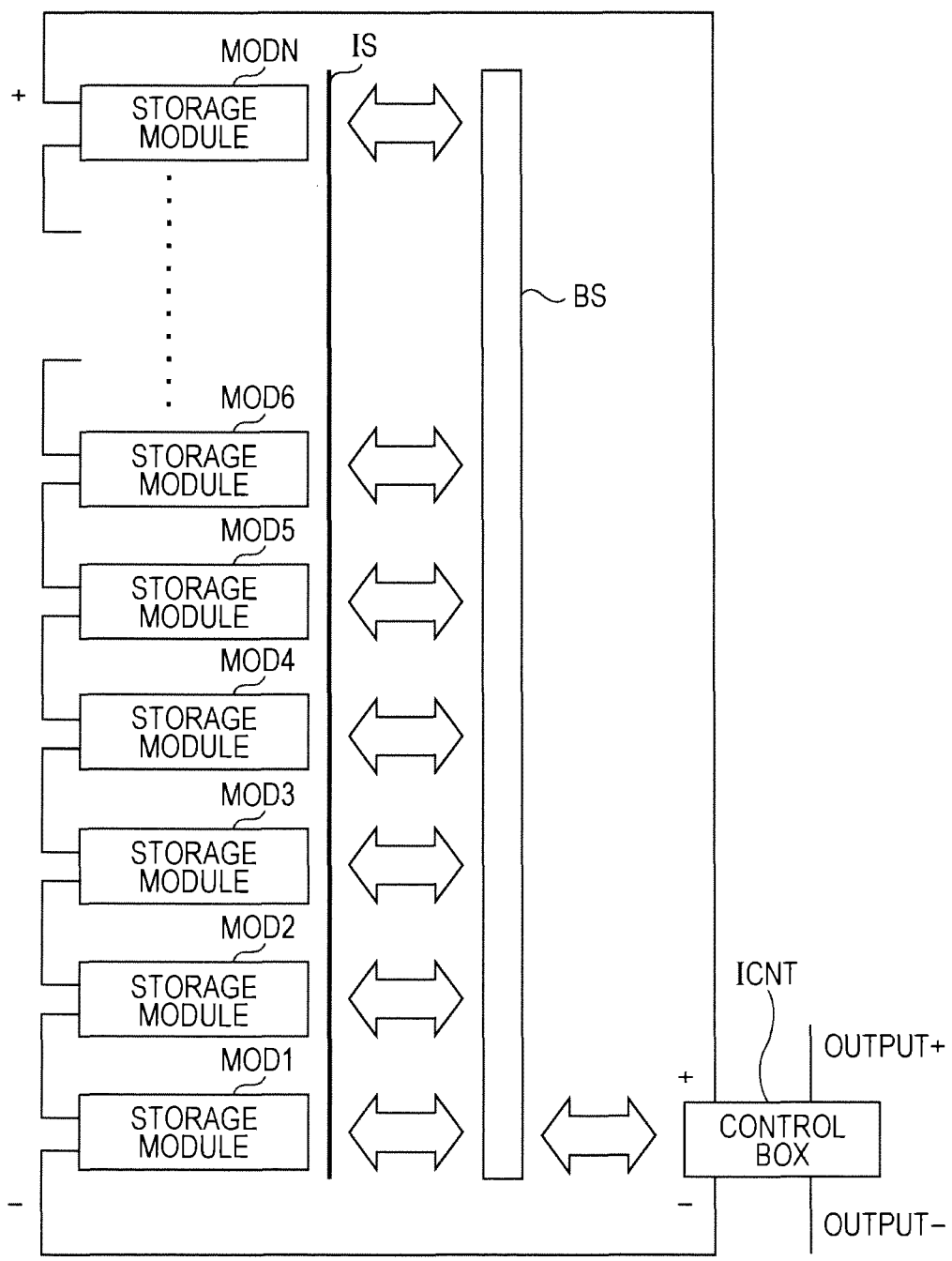
FIG. 1 is a block diagram of an exemplary storage system.

A storage module is a unit combining a plurality of battery cells and a controller. As illustrated in FIG. 1, N storage modules MOD1 to MODN are connected in series. The storage modules MOD1 to MODN are connected to an interface bus BS via an isolator IS.

Additionally, monitors (hereinafter designated module controllers as appropriate) are connected to an overall control apparatus ICNT (hereinafter designated control box as appropriate). The control box ICNT manages charging, discharging, and wear suppression. The control box ICNT may be realized by a microcontroller.

A serial interface is used as the bus inside the storage modules and as the bus BS that connects the storage modules MOD1 to MODN with the control box ICNT. For the specific serial interface, an SM bus (System Management Bus), CAN (Controller Area Network), or SPI (Serial Peripheral Interface) may be used. For example, an I2C bus may be used. On an I2C bus, synchronous serial communication is conducted on two signal lines, SCL (serial clock) and a bidirectional SDA (serial data).

The module controller CNT of each storage module MOD communicates with the control box ICNT. Namely, the control box ICNT receives information on the internal state of each storage module, or in other words battery information, with charging and discharging processes being managed for each storage module. The control box ICNT supplies the output of the N serially-connected storage modules (N□51.2 V) to a load. In the example where N=14, the output becomes 14 □51.2 V=716.8 V.

Exemplary Storage Module

Figure 2:
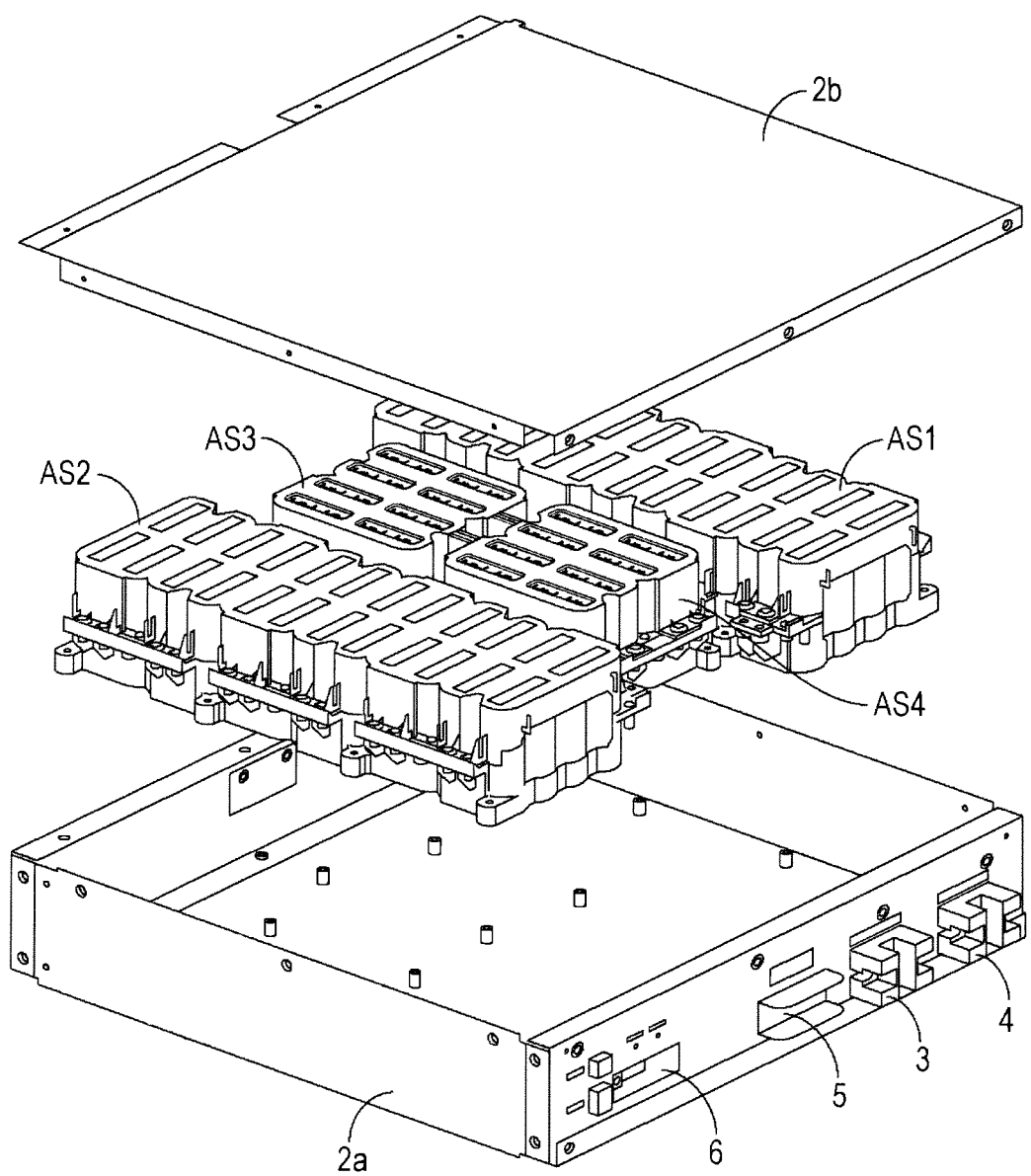
FIG. 2 is an exploded perspective view of an exemplary storage module.

FIG. 2 is a perspective view illustrating a mechanical configuration of a storage module MOD. The outer case of the storage module MOD includes a metallic outer case bottom 2a and outer case top 2b made from processed sheet metal. It is preferable to use a material having high terminal conductivity and emissivity as the material for the outer case bottom 2a and outer case top 2b, as excellent case heat dissipation can be obtained and temperature rises inside the case can be suppressed. For example, the material for the outer case bottom 2a and the outer case top 2b may be aluminum, an aluminum alloy, copper, or a copper alloy. On the back of the case are provided an external positive terminal 3 and an external negative terminal 4 for charging and discharging the storage module MOD.

A current breaker 5 is additionally provided on the back of the storage module MOD. By providing the current breaker 5, safety can be improved. Additionally, a connector 6 for communication with a control circuit disposed inside the case 2 is provided. The control circuit is provided in order to monitor the temperature of the battery unit and control charging, discharging, etc. Additionally, one or more LEDs or other display elements indicating the operational state are provided on the front of the case.

The outer case bottom 2a of the case has a box-like structure, with the outer case top 2b being provided so as to cover the opening. Sub-modules AS1 to AS4 are stored inside the storage space of the outer case bottom 2a. Since the sub-modules AS1 to AS4 are secured by being screwed in place, for example, a plurality of bosses are formed on the floor of the outer case bottom 2a. The sub-modules AS1 to AS4 are pre-assembled outside of the case.

Each sub-module is an integrated combination of a plurality of battery blocks by an insulating case that acts as a secondary storage case. For the sub-module case, a plastic or other molded component may be used. In the sub-modules AS1 to AS4, the plurality of battery blocks are stored inside cases such that the internal positive and negative terminals of the battery blocks are not exposed.

In a single battery block, eight cylindrical lithium-ion secondary batteries are connected in parallel, for example. The sub-modules AS1 and AS2 are integrated combinations of six battery blocks each by a case top and a case bottom. The sub-modules AS3 and AS4 are integrated combinations of two battery blocks each by a case top and a case bottom. Consequently, a total of 6+6+2+2=16 battery blocks are used. These battery blocks are connected in series, for example.

In order to connect the battery blocks in series in each of the sub-modules AS1 to AS4, a connecting metal plate such as a bus bar is used. A bus bar is a long, thin bar of metal. A plurality of holes are formed on the bus bar for connecting with connecting metal plates, etc. leading out from the battery blocks.

Figure 3:
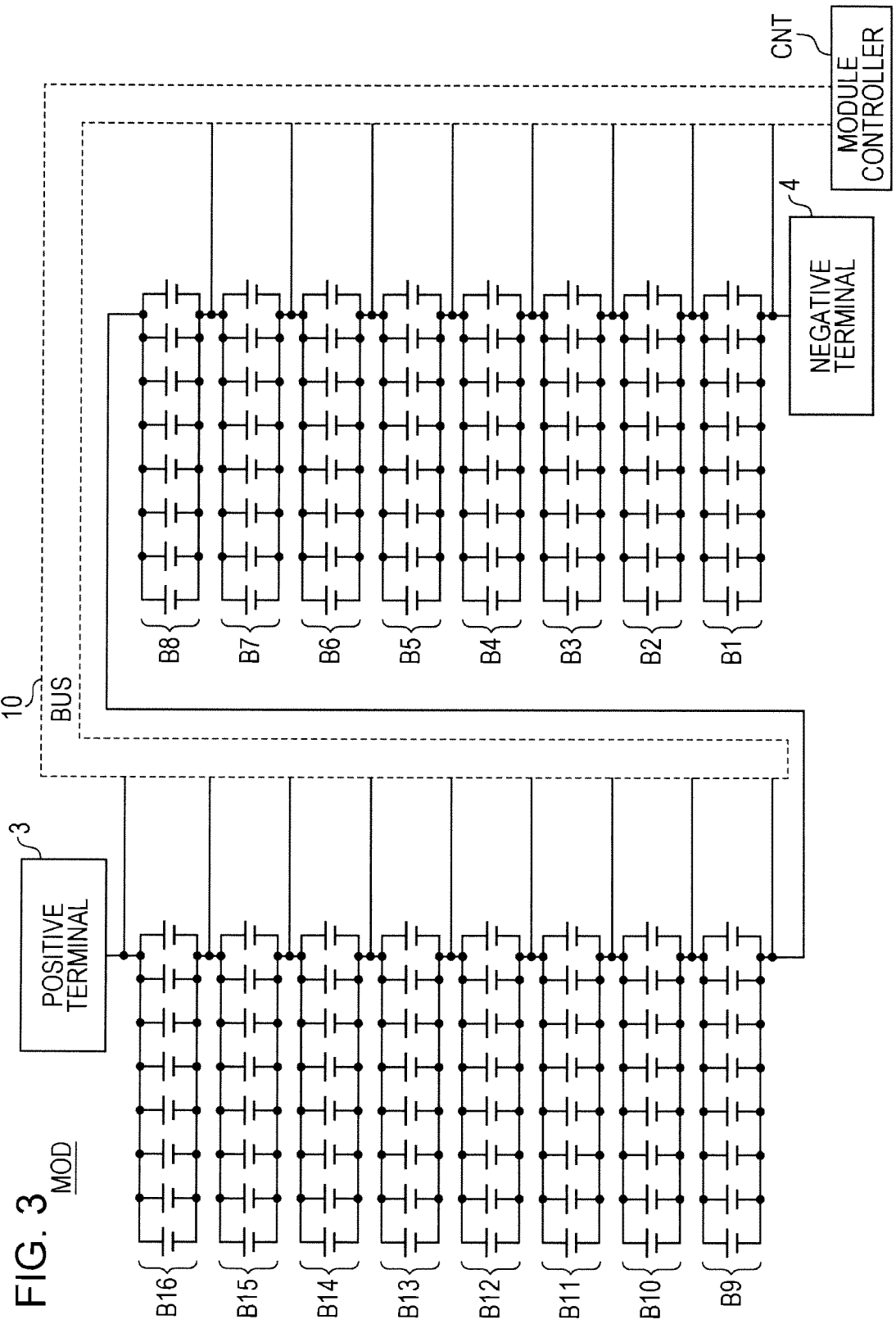
FIG. 3 is a wiring diagram illustrating the wiring configuration of an exemplary storage module.

As illustrated in FIG. 3, battery blocks B1 to B16 are connected in series, with each having eight batteries connected in parallel. The battery blocks B1 to B16 are connected to the module controller CNT that acts as the control apparatus for each storage module, with charging and discharging being controlled. Charging and discharging is done via the external positive terminal 3 and the external negative terminal 4. For example, the battery blocks B1 to B6 may be included in the sub-module AS1, and the battery blocks B11 to B16 may be included in the sub-module AS2. Additionally, the battery blocks B7 and B10 may be included in the sub-module AS3, and the battery blocks B8 and B9 may be included in the sub-module AS4.

Information on the voltage between the positive and negative electrodes of each battery block, etc. is supplied to the module controller CNT via a bus 10. The module controller CNT monitors the voltage, current, and temperature of each battery block, and outputs the monitoring results as battery information. For example, a single storage module MOD may output 16 □3.2 V=51.2 V.

Figure 4:
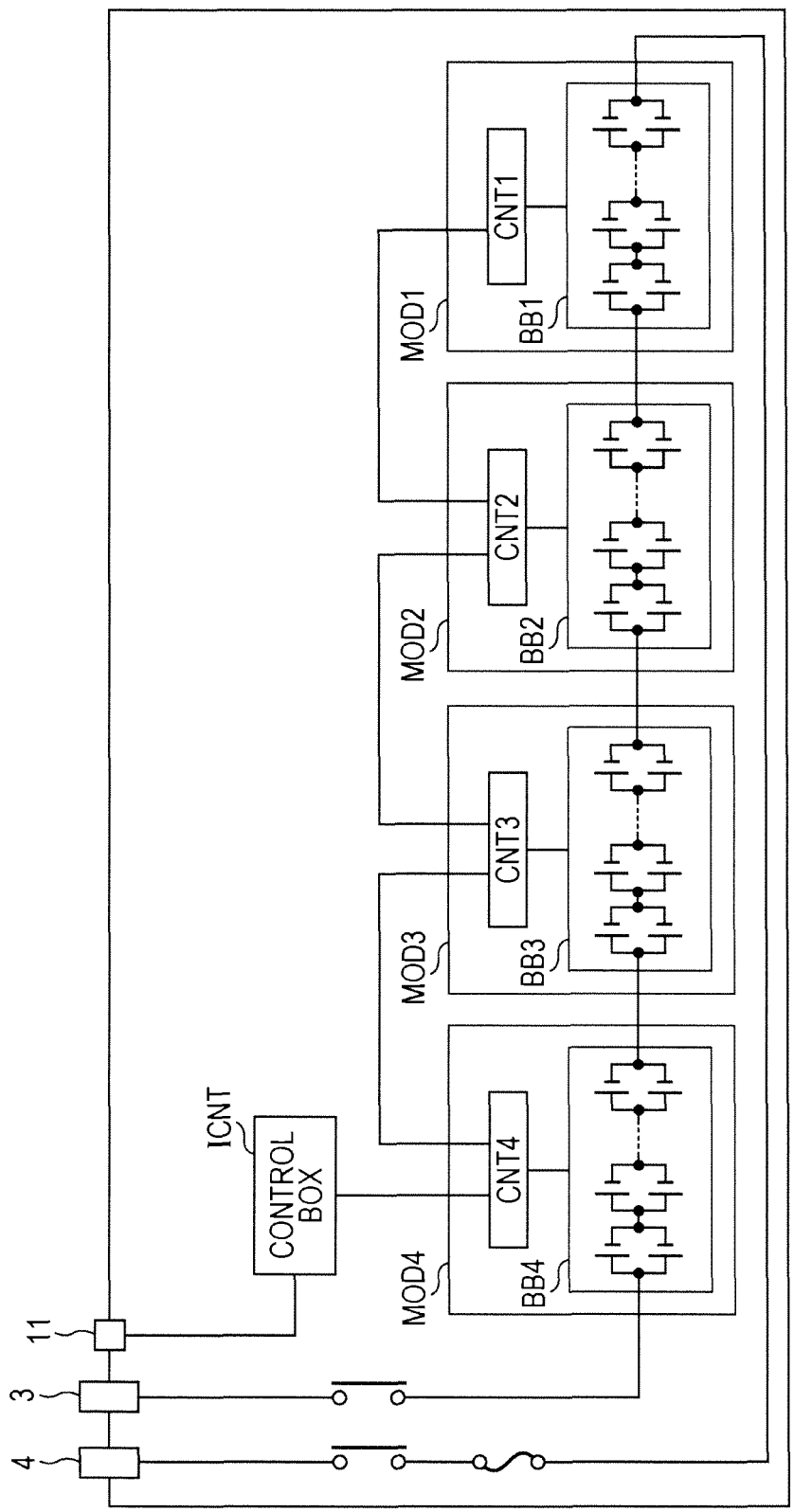
FIG. 4 is a block diagram illustrating a specific configuration of a storage system.

FIG. 4 illustrates a more specific connection configuration of a storage system. For example, four storage modules MOD1 to MOD4 may be connected in series. In this case, the total voltage retrieved from the positive terminal 3 (VB+) and the negative terminal 4 (VB−) is approximately 200 V. The storage modules include module controllers CNT1 to CNT4 and battery block groups BB1 to BB4, respectively. In each battery block group, 16 battery blocks are connected in series, for example.

The module controllers CNT1 to CNT4 are connected via a bus, with the communication terminal of the module controller CNT4 connected to the control box ICNT. Information on the per-module voltage, etc. from each module controller is transmitted to the control box ICNT. The control box ICNT additionally includes a communication terminal 11 enabling external communication.

Exemplary Module Controller

An exemplary configuration of a module controller will be described with reference to FIG. 5. The module controller CNT is configured to detect the voltage between the terminals of n battery blocks B1 to Bn connected in series, as well as the voltage of each battery block. Provided is a multiplexer 15 that successively outputs the voltage between the terminals of the battery blocks B1 to Bn and the voltage of each battery block.

The multiplexer 15 switches channels according to a given control signal and selects one set of analog voltage data from among n sets of analog voltage data. A set of analog voltage data selected by the multiplexer 15 is supplied to an A/D converter 16 (labeled an ADC, or Analog to Digital Converter, in FIG. 5).

The A/D converter 16 converts analog voltage data supplied from the multiplexer 15 into digital voltage data. For example, analog voltage data may be converted into 14-bit to 18-bit digital voltage data. Herein, various techniques such as successive approximation or delta-sigma may be used as the conversion technique in the A/D converter 16.

Digital voltage data from the A/D converter 16 is supplied to a communication unit 17. The communication unit 17 is controlled by a controller 18, and communicates with external apparatus connected via communication terminals 19a and 19b. For example, communication with the module controller of another module may be conducted via the communication terminal 19a, while communication with the control box ICNT may be conducted via the communication terminal 19b. Additionally, the module controller CNT receives a control signal from the control box ICNT via the communication terminal 19b. In this way, the communication unit 17 communicates bidirectionally.

Additionally, it is configured such that the controller 18 controls voltage leveling across battery blocks. Such control is designated cell balancing. For example, in the case where one battery block from among the plurality of battery blocks B1 to Bn has reached the low-voltage threshold, other battery blocks still having remaining charge may exist. At the next charging, the other battery blocks with remaining charge may quickly reach the high-voltage threshold, and charging to full charge may be difficult. In order to avoid such imbalances, battery blocks with remaining charge are forcibly made to discharge by switching on a MOSFET (Metal-Oxide-Semiconductor Field-Effect Transistor). However, the cell balancing technique is not limited to the passive technique discussed above, and what are called active techniques and various other techniques may be applied. Module balancing in this disclosure will be described in detail later.

Meanwhile, the module controller CNT discussed earlier monitors the voltage of each battery block, converts the detected voltages into digital signals, and transmits the digital signals to the control box ICNT. In addition to voltage, the temperature of each battery block may also be detected, with the temperatures converted into digital data and transmitted to the control box ICNT.

Figure 5:
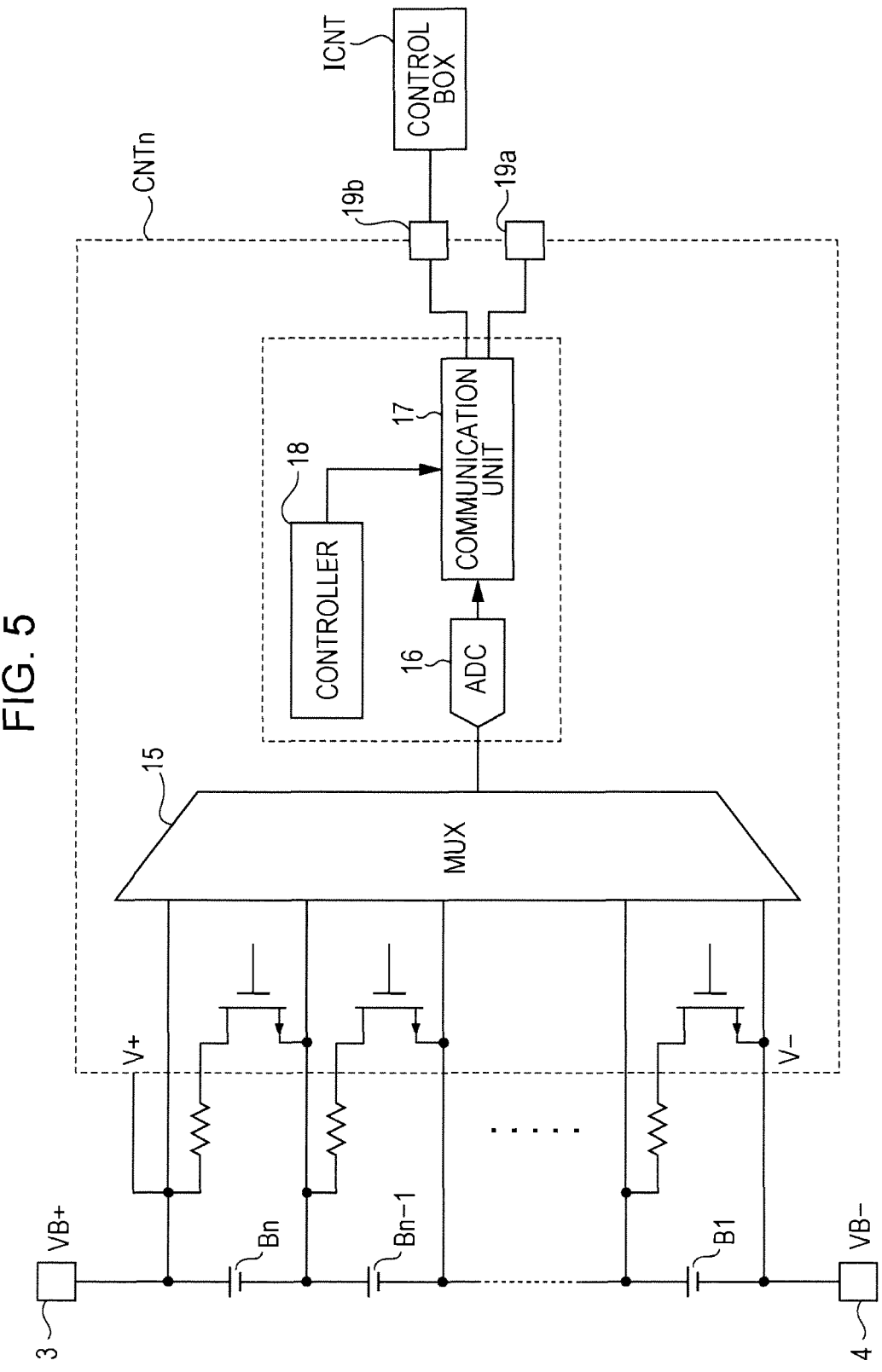
FIG. 5 is a block diagram of an exemplary module controller.

Power for the module controller CNT is supplied from the battery blocks B1 to Bn, as illustrated in FIG. 5. However, if the battery blocks B1 to Bn are used as the power supply, disparities in the capacity of the battery blocks B1 to Bn may occur among modules since the amounts of power consumed by the module controllers CNT are not equal to each other, and module imbalances may occur. Given this factor, it is preferable to not use the battery blocks B1 to Bn as the power supply for the module controller CNT.

In the module controller CNT illustrated in FIG. 5, the A/D converter 16, the communication unit 17, and the controller 18 enclosed by the inner broken lines constitute a low-voltage power unit able to operate on a 5 V power supply, for example. In this disclosure, it is configured such that power to the low-voltage power unit is supplied from the control box ICNT. If power is supplied from the battery blocks B1 to Bn, there is a risk of disrupting the module balance due to different amounts of power consumed by the module controllers CNT. In this disclosure, since power to the low-voltage power units of the module controllers CNT is supplied from the control box ICNT, such a problem may not occur.

First Example of Storage System According to the Disclosure

Figure 6:
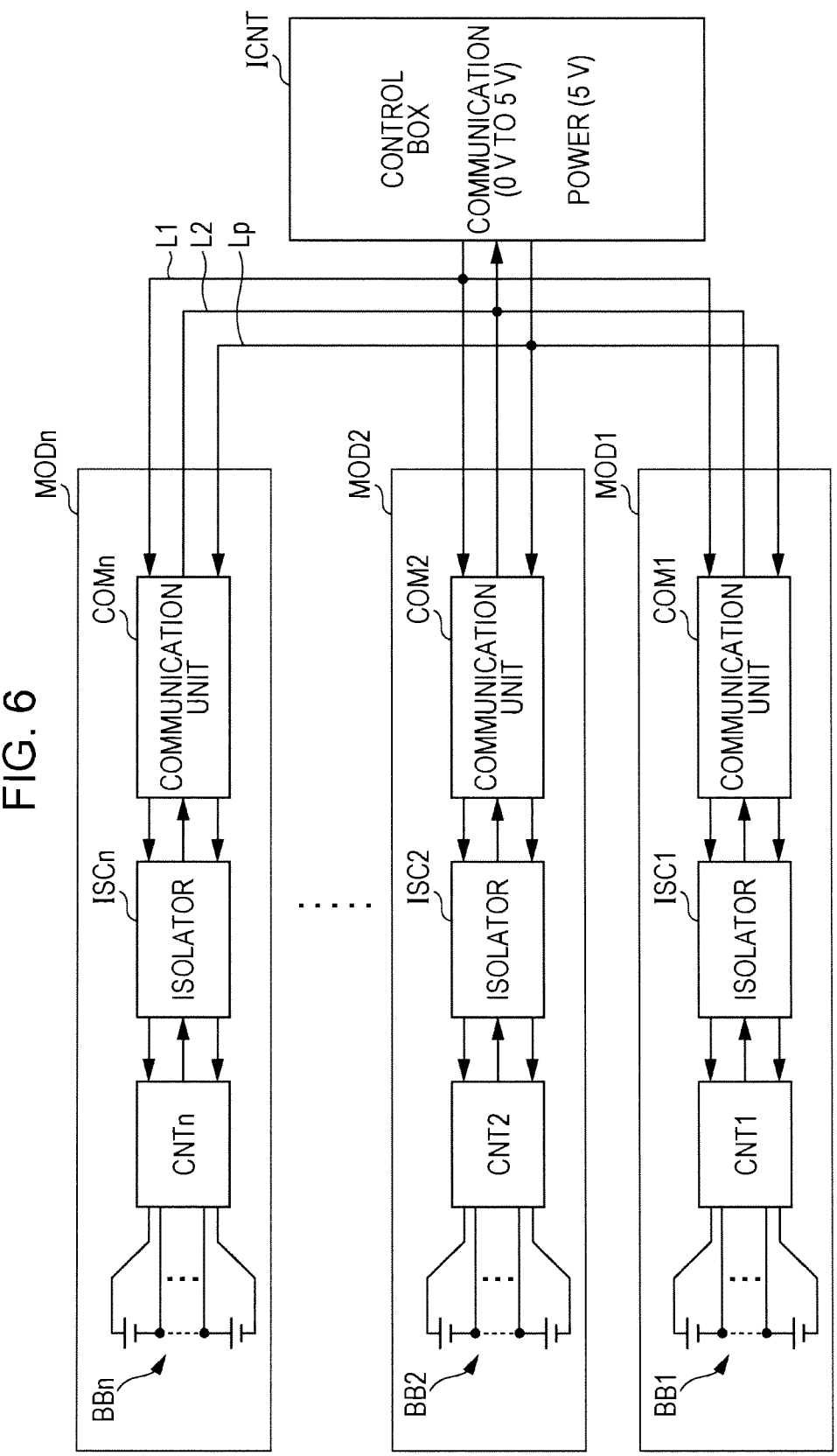
FIG. 6 is a block diagram illustrating a first example of a configuration of a storage system connecting a plurality of storage modules.

FIG. 6 illustrates a first example of a configuration in which the present disclosure has been applied to a storage system having n storage modules MOD1 to MODn. The storage modules include communication units COM1 to COMn, isolators ISC1 to ISCn, module controllers CNT1 to CNTn, and battery block groups BB1 to BBn, respectively. The n storage modules are connected to a control box ICNT. For connection, communication lines L1 and L2 and a power supply line Lp are used. Bidirectional communication between the control box ICNT and the storage modules MOD1 to MODn is done via the communication lines L1 and L2. CAN is used as the communication protocol, for example. Recently, CAN is being used for in-vehicle LAN.

The respective communication units COM1 to COMn in the storage modules correspond to the communication unit 17 in FIG. 5. Consequently, the module controllers CNT1 to CNTn in FIG. 6 are configured to not include the communication unit 17 compared to the configuration in FIG. 5. However, both the communication units COM1 to COMn and the communication unit 17 may also be provided and configured to have respectively different functions. A power supply voltage such as +5 V is supplied via the power supply line Lp as power for the low-voltage power unit in each storage module.

The isolators ISC1 to ISCn function to isolate the communication units COM1 to COMn and the module controllers CNT1 to CNTn from each other. In other words, the reference potential of the power supply for the communication units COM1 to COMn and the reference potential of the power supply for the module controllers CNT1 to CNTn are split and made to be independent. Additionally, the isolators ISC1 to ISCn function to supply power supply voltage to the module controllers CNT1 to CNTn and function as a bidirectional communication transmission medium while in an isolated state.

As an example, take the power supply voltage for the control box ICNT and the communication units COM1 to COMn to be 0 V to +5 V. Take the power supply voltage for the module controller CNT1 of the storage module MOD1 to be 0 V to +5 V, the power supply voltage for the module controller CNT2 of the storage module MOD2 to be +50 V to +55 V, and the power supply voltage for the module controller CNTn of the storage module MODn to be (+50☐n) V to (+50☐n)+5 V.

Isolators

The CAN standard may be used as the protocol for bidirectional communication conducted via the isolators ISC1 to ISCn. Electromagnetic induction, magnetic resonance, or electromagnetic radiation techniques may be used as the technique for power transmission conducted via the isolators ISC1 to ISCn.

In this disclosure, contactless smart card technology is used. With contactless smart card technology, the antenna coil of a reader/writer is made to magnetically couple with the antenna coil of a card to conduct communication and power transmission between the reader/writer and card. Communication utilizes a technique of applying ASK (Amplitude Shift Keying) modulation to a carrier wave at a frequency of 13.56 kHz, and is conducted at a speed of 212 kbps or 424 kbps. The isolators ISC1 to ISCn are made to specifications similar to the above contactless smart card protocol. Additionally, the isolators ISC1 to ISCn are configured to conduct communication and power transmission between antennas (coils) formed on different layers of a multilayer printed circuit board.

Figure 7:
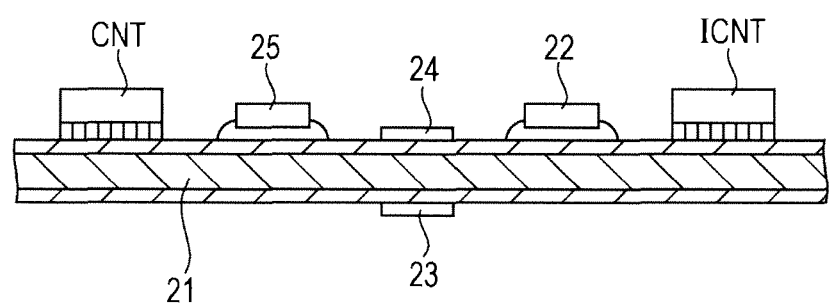
FIG. 7 is a schematic diagram illustrating how components are packaged on a multilayer circuit board for a storage module.

As illustrated in FIG. 7, a microprocessor unit (MPU) constituting the control box ICNT and a reader/writer chip 22 for the contactless smart card protocol are mounted on a multilayer PCB 21. In addition, PCB antennas 23 and 24, a card chip 25 for the contactless smart card protocol, and the module controller CNT are mounted on the multilayer PCB 21.

Figure 8:
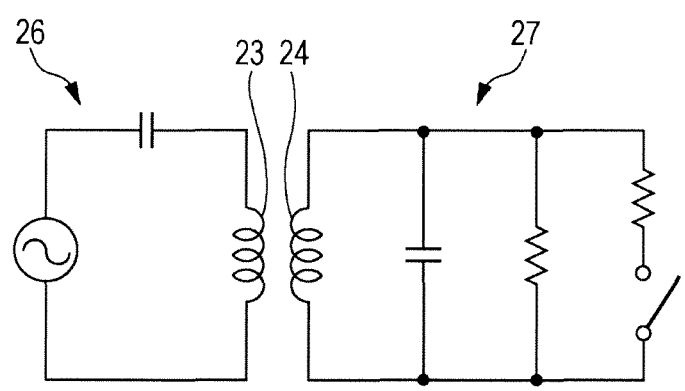
FIG. 8 is a wiring diagram illustrating the circuit layout of an exemplary isolator.

As schematically illustrated in FIG. 8, with the contactless smart card protocol, a transmit signal is formed from the antenna 23 of a reader/writer unit 26 to a card unit 27 with a carrier wave amplitude from 2 Vop to 13 Vop and an approximately 10% degree of modulation, for example. The transmit signal is transmitted from the antenna 23 to the antenna 24 of the card unit 27. At the antenna 24, the received signal is a high-frequency signal with a carrier wave amplitude from 2 Vop to 13 Vop and an approximately 10% degree of modulation, for example. Power is formed at the card unit 27 by smoothing the received signal. The power consumption of the card unit 27 is significantly low.

Figure 9A:
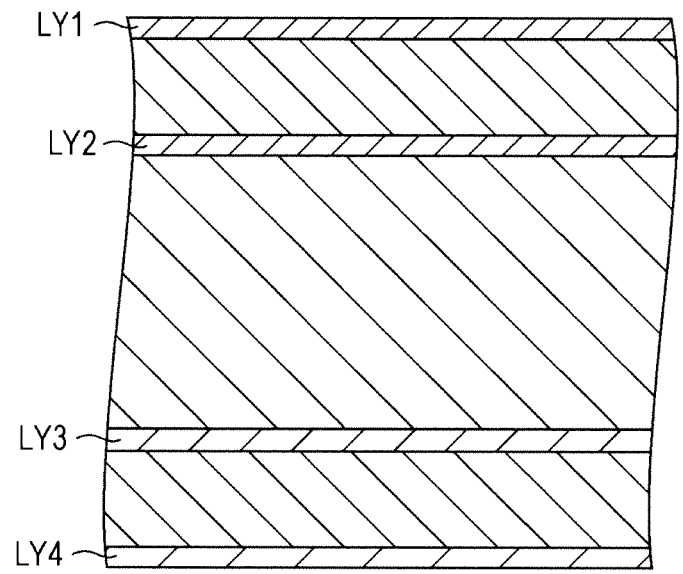
FIGS. 9A and 9B are cross-section diagrams for explaining a two-layer circuit board and a four-layer circuit board.
Figure 9B:
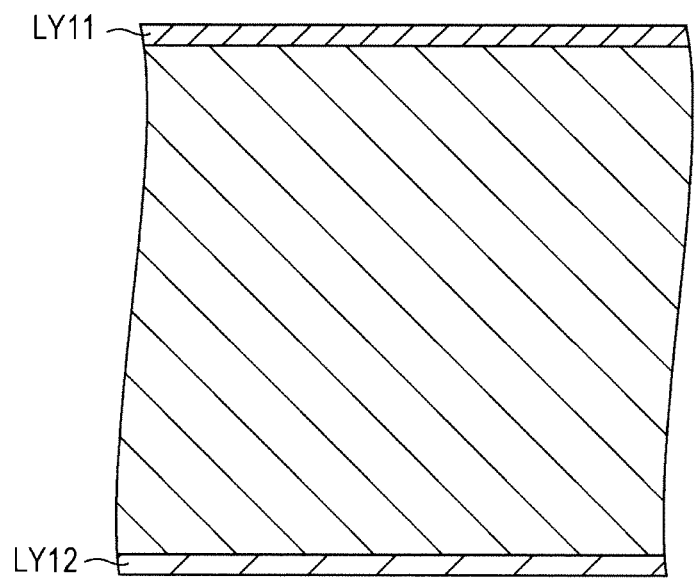

An exemplary PCB antenna will now be described. As illustrated in FIG. 9A, a four-layer PCB having four trace layers LY1 to LY4 may be used as the multilayer PCB 21 on which antennas are formed as conductive patterns. Alternatively, as illustrated in FIG. 9B, a two-layer PCB having two trace layers LY11 and LY12 may be used.

Figure 10A:
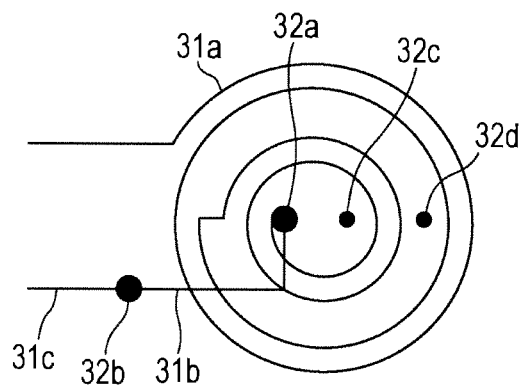
FIGS. 10A and 10B are schematic diagrams for explaining specific examples of a PCB antenna.

As illustrated in FIG. 10A, the primary (reader/writer) antenna 23 is formed with a coil pattern 31a, a linear pattern 31b, and a linear pattern 31c. The coil pattern 31a is formed on the fourth trace layer LY4 of the four-layer PCB, with the end at the center of the pattern 31a connected via a land and a through-hole to a land 32a on the third trace layer LY3. The linear pattern 31b is formed between the land 32a and the land 32b. The land 32b is connected to the linear pattern 31c via a through-hole and a land on the third trace layer LY3. The ends of the patterns 31a and 31c are connected to connectors not illustrated.

Figure 10B:
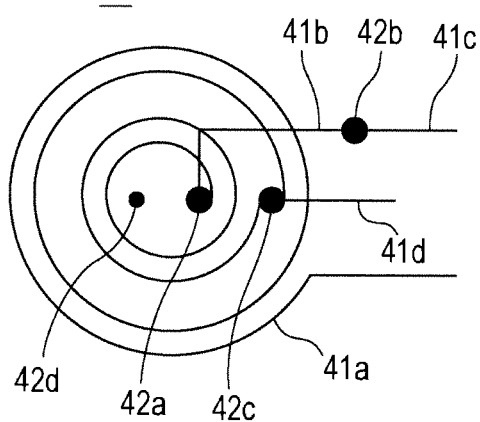

As illustrated in FIG. 10B, the secondary (card) antenna 24 is formed with a coil pattern 41a, a linear pattern 41b, a linear pattern 41c, and a linear pattern 41d. The coil pattern 41a, one end of which is connected to a connector (not illustrated), is formed on the first trace layer LY1 of the four-layer PCB. The land 42a is connected to the linear pattern 41b via a through-hole and a land on the second trace layer LY2. One end of the pattern 41b is connected to a land on the first trace layer LY1 via a land 42b and a through-hole. One end of the linear pattern 41c is connected to a land on the first trace layer LY1. The other end of the linear pattern 41c is connected to a connector (not illustrated). Additionally, one end of the linear pattern 41d is connected to a land 42c which is connected to the coil pattern 41a. The other end of the linear pattern 41d is connected to a reference potential point.

In cases where patterns intersect, the PCB antennas are realized by different trace layer patterns. Through-holes and lands are used to connect different trace layers. As a result, extra lands 32c and 32d are produced on the fourth trace layer as illustrated in FIG. 10A, and an extra land 42d is produced on the first trace layer.

It may also be configured such that jumper lines are used instead of forming the above-described patterns on other trace layers of the PCB. In other words, jumper lines may be used instead of the pattern 31b in FIG. 10A as well as the patterns 41b and 41d in FIG. 10B. In this case, a two-layer PCB may be used, through-holes may be omitted, and the production of extra lands can be avoided. By not forming through-holes, it becomes possible to further increase the dielectric strength of the PCB.

The isolators in this disclosure provide insulation between the primary antenna and the secondary antenna by means of the PCB. Consequently, with the isolators in this disclosure a DC insulation voltage of 1000 V or more becomes possible. This furthermore has the merit of enabling bidirectional communication and power transmission, while reducing costs.

Cell Balancing

In this disclosure, the voltage balance among the above-described plurality of storage modules MOD1 to MODn (hereinafter simply designated the module balance) is controlled. In other words, the output voltages of the storage modules are leveled by module balancing. Since each storage module includes many battery cells, disparities among modules are ordinarily greater than the voltage balance among battery cells inside the storage modules (hereinafter simply designated the cell balance). Consequently, it is worthwhile to balance modules even if the cells within the storage modules are also being balanced.

Figure 11A:
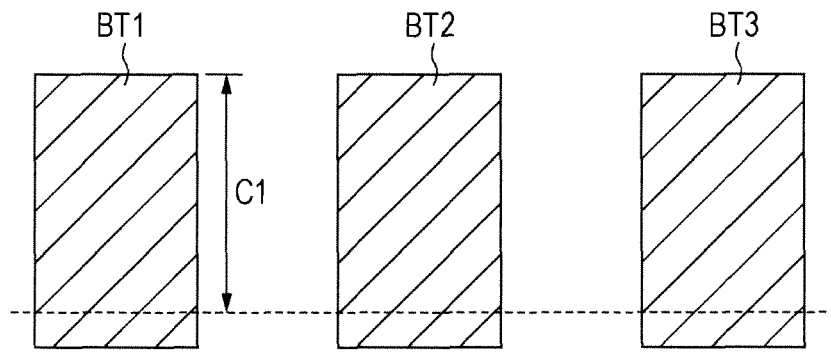
FIGS. 11A to 11C are schematic diagrams for explaining bottom balancing.
Figure 11B:
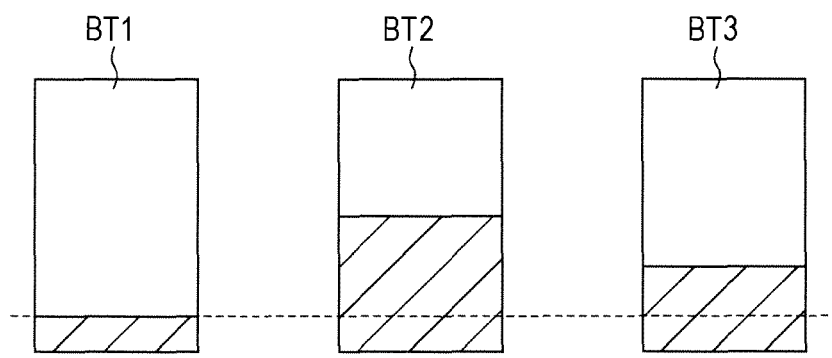
Figure 11C:
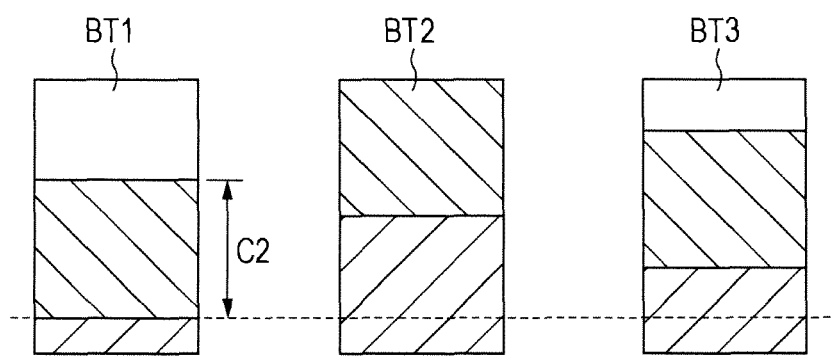

Before describing the present disclosure, typical cell balancing will be described. As illustrated in FIGS. 11A to 11C, the cell balance among three battery cells BT1, BT2, and BT3 will be investigated. First, assume that all battery cells are fully charged, as illustrated in FIG. 11A. Next, assume that the battery cells have discharged and disparities in the discharge amounts have occurred, and that the voltage of the battery cell BT1 has reached the low-voltage threshold indicated by the broken line, as illustrated in FIG. 11B. Due to the disparities among the battery cells, the other battery cells BT2 and BT3 have not yet reached the low-voltage threshold. Differences in self-discharge rates may be the cause of the disparities in the discharge amounts among the battery cells, for example.

If charging commences in this state, the battery cell BT2, which had the most charge remaining at the time the voltage of the battery cell BT1 reached the low-voltage threshold, may reach full charge first. At this point, the battery cell BT1 may not have been charged to full charge, as illustrated in FIG. 11C. Consequently, the amount that can be discharged from a full charge may decrease from the discharge amount C1 to the discharge amount C2.

Figure 12A:
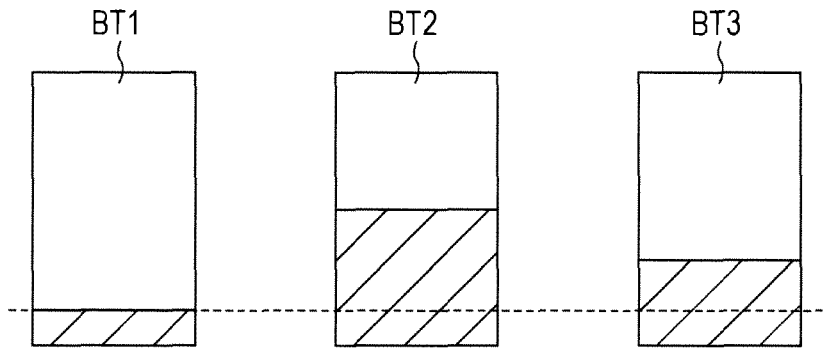
FIGS. 12A to 12C are schematic diagrams for explaining active bottom cell balancing operation.
Figure 12B:
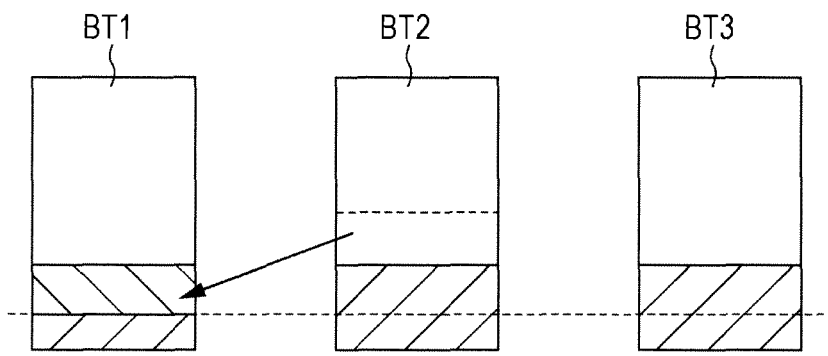
Figure 12C:
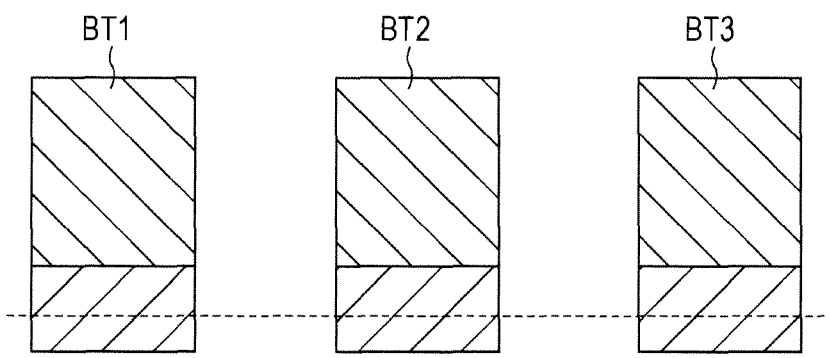

In order to solve this problem, as illustrated in FIGS. 12A and 12B, the remaining charges are nearly equalized by transferring power from the battery cell BT2, which had the most charge remaining (highest potential) at the time the battery cell BT1 reached the low-voltage threshold, to the battery cell BT1, which had the least charge (lowest potential). By subsequently charging the battery cells BT1, BT2, and BT3, the three battery cells can be charged to nearly the full charge voltage. In practice, the process is repeated multiple times.

Such control is designated active bottom cell balancing. With bottom cell balancing, decreases in the dischargeable amount can be prevented. Passive bottom cell balancing designates a technique in which, given the state illustrated in FIG. 12A, the battery cells BT2 and BT3 are discharged to match the potential of the battery cell BT1 with the lowest potential. Compared to passive techniques, active techniques can utilize charge more effectively and are thus preferable.

Figure 13A:
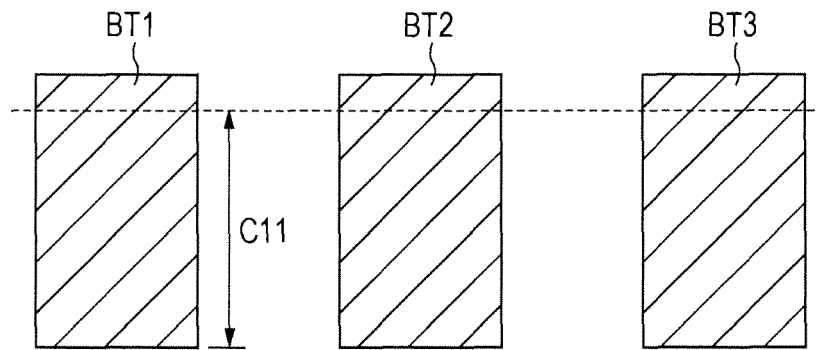
FIGS. 13A to 13C are schematic diagrams for explaining top balancing.
Figure 13B:
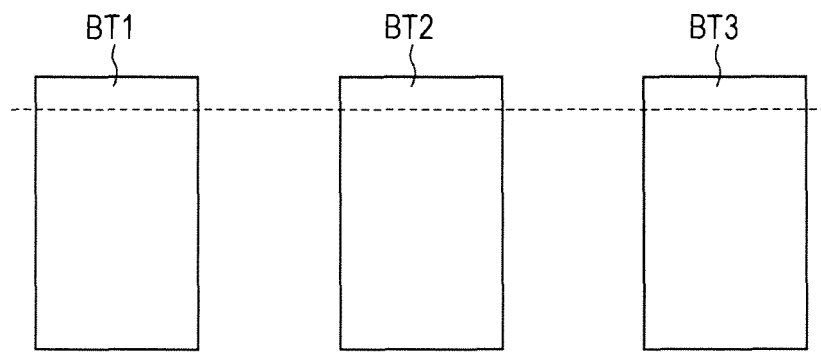

Active balancing will not be described with reference to FIGS. 13A to 13C and 14A to 14C. First, assume that all battery cells have been fully charged, as illustrated in FIG. 13A. Next, assume that the battery cells are discharged, as illustrated in FIG. 13B.

Figure 13C:
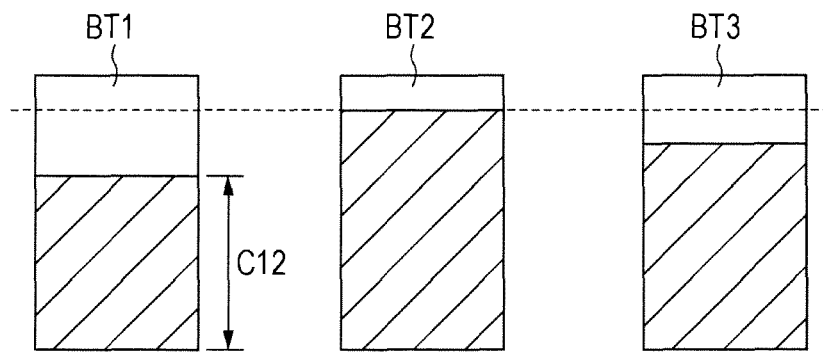

If charging subsequently commences, the voltage of the battery cell BT2 reaches the high-voltage threshold first, as illustrated in FIG. 13C. At this point, the voltages of the battery cells BT1 and BT3 have not reached the high-voltage threshold. Consequently, the charged amount decreases as indicated by C12 with respect to the charged amount C11 (FIG. 13A).

Figure 14A:
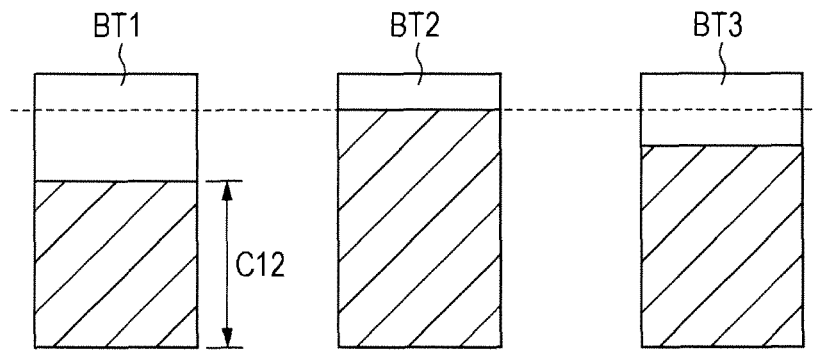
FIGS. 14A to 14C are schematic diagrams for explaining active top cell balancing operation.
Figure 14B:
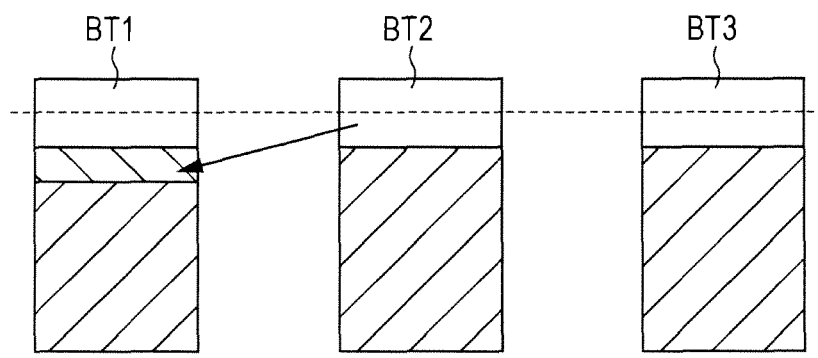
Figure 14C:
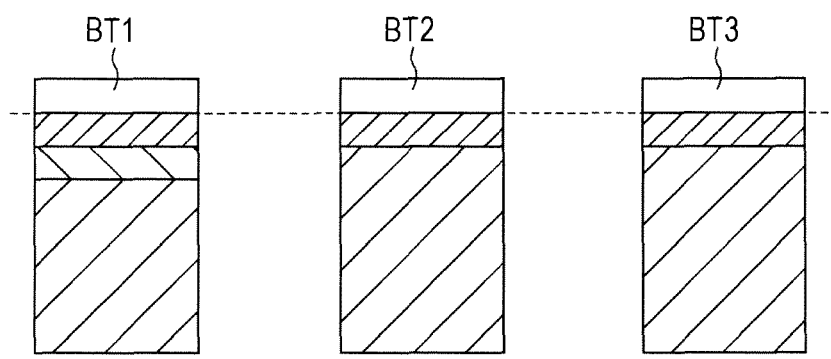

In order to solve this problem, as illustrated in FIGS. 14A and 14B, the remaining charges are nearly equalized by transferring power from the battery cell BT2, which had the most charge (highest potential) at the time the battery cell BT2 reached the high-voltage threshold, to the battery cell BT1, which had the least charge (lowest potential). By subsequently charging the battery cells BT1, BT2, and BT3, the three battery cells can be charged to nearly the full charge voltage. In practice, the process is repeated multiple times.

Such control is designated active top cell balancing. With top cell balancing, decreases in the chargeable amount can be prevented. Passive top cell balancing designates a technique in which, given the state illustrated in FIG. 14A, the battery cells BT2 and BT3 are discharged to match the potential of the battery cell BT1 with the lowest potential. Compared to passive techniques, active techniques can utilize charge more effectively and are thus preferable.

Cell Balancing Circuit of the Related Art

An exemplary active bottom cell balancing circuit of the related art that uses a flyback transformer will now be described with reference to FIGS. 15A to 15B and 16A to 16D. The cathode and anode of each battery cell are respectively connected to both ends of primary coils W1 to W6. The cathode and anode of six battery cells BT1 to BT6 connected in series are connected to both ends of a secondary coil W0. Additionally, a common magnetic core M is provided. Additionally, the secondary coil W0 is connected in series to a secondary switch S0, and the primary coils W1 to W6 are respectively connected in series to primary switches S1 to S6. The switches S0 to S6 are realized with MOSFETs (Metal-Oxide-Semiconductor Field-Effect Transistor), for example.

Figure 15B:
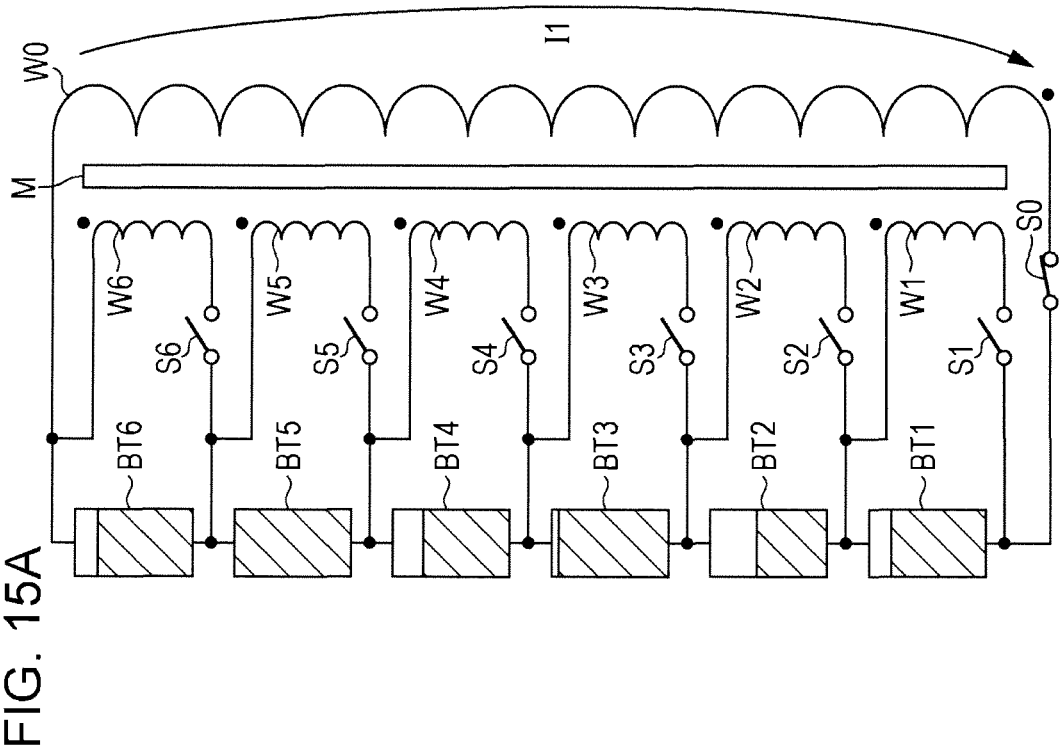
FIGS. 15A and 15B are wiring diagrams of an active bottom cell balancing circuit of the related art.
Figure 15A:
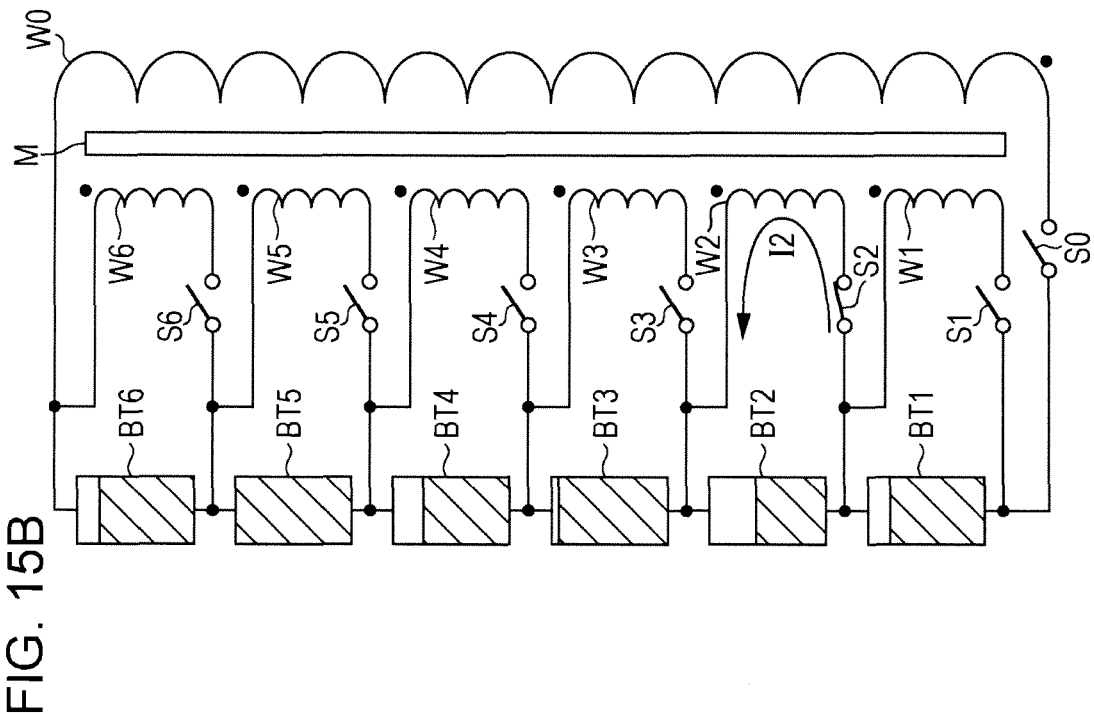
Figure 16A:
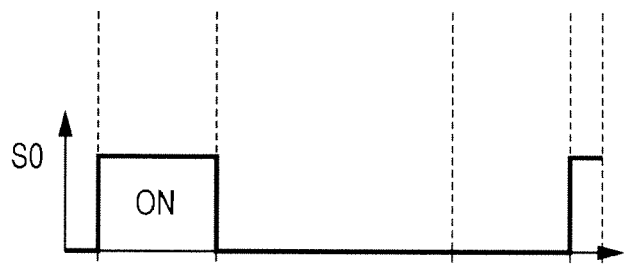
FIGS. 16A to 16D are timing charts for explaining operation of an active bottom cell balancing circuit of the related art.
Figure 16B:
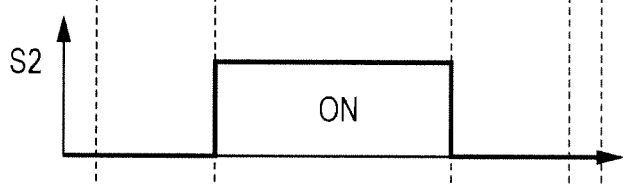
Figure 16C:
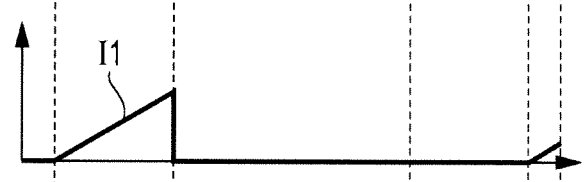

FIGS. 16A to 16D are timing charts for operation of the active bottom cell balancing circuit illustrated in FIGS. 15A and 15B. As an example, the respective voltages of the battery cells BT1 to BT6 are detected by a monitor not illustrated, and the voltage of the battery cell BT2 is the lowest. In this case, power is moved to the battery cell BT2 from the other battery cells. First, the switch S0 is switched on as illustrated in FIGS. 15A and 16A, and a current I1 as illustrated in FIG. 16C flows in the coil W0, magnetizing the magnetic core M.

Figure 16D:
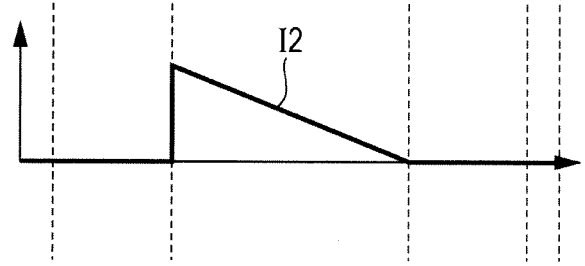

Next, the primary switch S2 connected in series to the coil W2 is switched on as illustrated in FIGS. 15B and 16B, while in addition, the secondary switch S0 is switched off, as illustrated in FIG. 16A. Electromagnetic energy in the magnetic core M is released and a current I2 flows through the primary coil W2, as illustrated in FIG. 16D. This current I2 flows into the battery cell BT2, charging the battery cell BT2.

After that, the primary switch S2 is switched off, as illustrated in FIG. 16B. Additionally, a pause is subsequently held for a given amount of time. Operation is repeated, with the above on-period of the secondary switch S0, the on-period of the primary switch S2, and the pause period making up the cycle period.

An exemplary active top cell balancing circuit of the related art will now be described with reference to FIGS. 17A to 17B and 18A to 18D. The cathode and anode of each battery cell are respectively connected to both ends of primary coils W1 to W6. The cathode and anode of six battery cells BT1 to BT6 connected in series are connected to both ends of a secondary coil W0. Additionally, a common magnetic core M is provided. Additionally, the secondary coil W0 is connected in series to a secondary switch S0, and the primary coils W1 to W6 are respectively connected in series to primary switches S1 to S6. The switches S0 to S6 are realized with MOSFETs, for example.

Figure 17A:
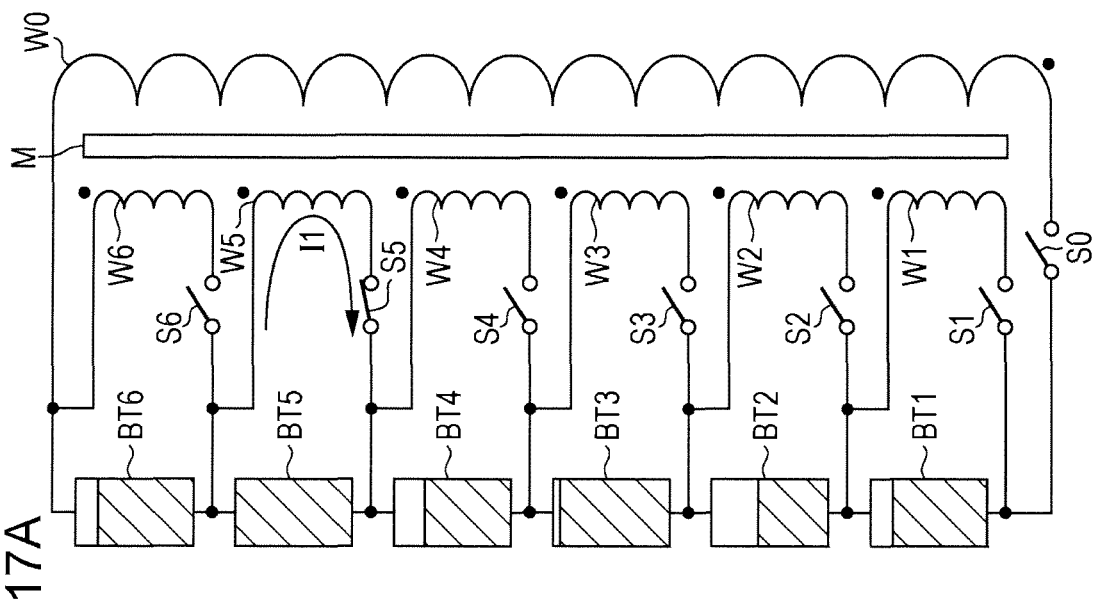
FIGS. 17A and 17B are wiring diagrams of an active top cell balancing circuit of the related art.
Figure 17B:
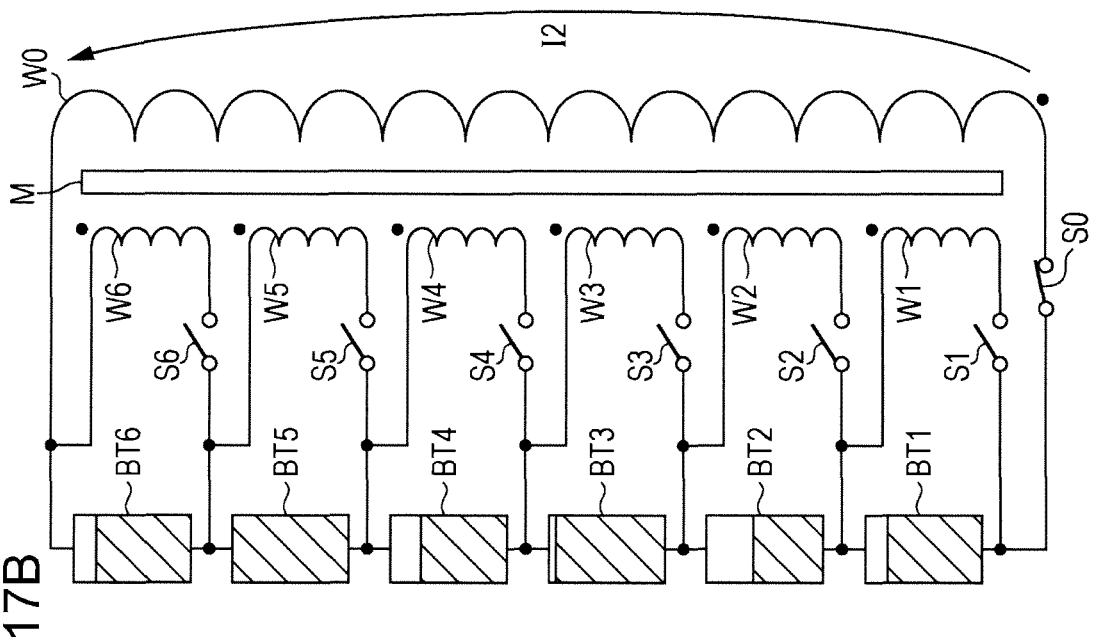
Figure 18A:
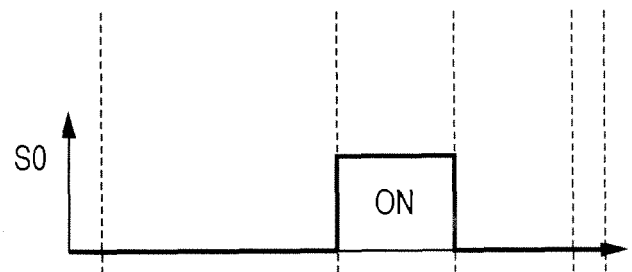
FIGS. 18A to 18D are timing charts for explaining operation of an active top cell balancing circuit of the related art.
Figure 18B:
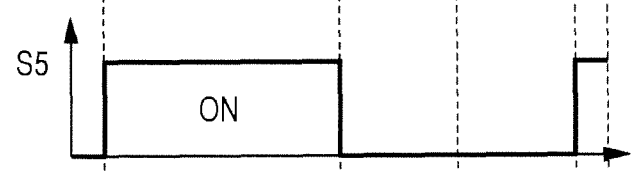
Figure 18C:
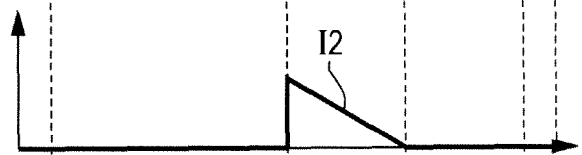
Figure 18D:
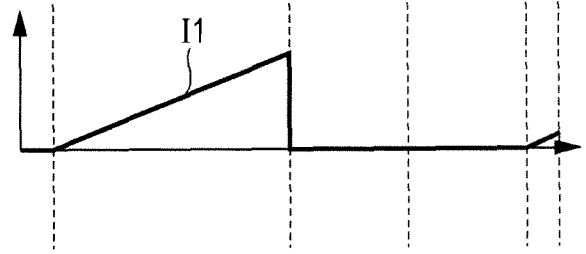

FIGS. 18A to 18D are timing charts for operation of the active top cell balancing circuit illustrated in FIGS. 17A and 17B. As an example, the respective voltages of the battery cells BT1 to BT6 are detected by a monitor not illustrated, and the voltage of the battery cell BT5 is the highest. In this case, power is moved to the battery cell BT5 from the other battery cells. First, the switch S5 is switched on as illustrated in FIGS. 17A and 18B, and a current I1 flows through the coil W5 as illustrated in FIG. 18D, magnetizing the magnetic core M.

Next, the secondary switch S0 is switched on as illustrated in FIGS. 17B and 18A, while in addition, the primary switch S5 is switched off, as illustrated in FIG. 18B. Due to the electromagnetic energy in the magnetic core M, a current I2 flows through the secondary coil W0, as illustrated in FIG. 18C. This current I2 flows into the battery cells BT1 to BT6 connected in series, and power is distributed among the battery cells.

After that, the secondary switch S0 is switched off, as illustrated in FIG. 18A. Additionally, a pause is subsequently held for a given amount of time. Operation is repeated, with the above on-period of the primary switch S5, the on-period of the secondary switch S0, and the pause period making up the cycle period.

Module Balancing Circuit

The balancing circuit of the related art discussed above relates to battery cells, and problems occur when applied to balance among the modules described with reference to FIGS. 1 to 6. Herein, module balance refers to the voltage balance of battery units that include a plurality of battery cells or battery blocks inside respective storage modules. Ordinarily, imbalances among modules take greater values versus imbalances within modules. Although it is possible to resolve imbalances among modules as a result of balancing each storage module, the process takes more time. However, module balancing and the cell balancing of the related art discussed above may also be used in conjunction. As an example, in this case inter-module balancing is conducted first and then intra-module balancing is conducted.

Figure 19:
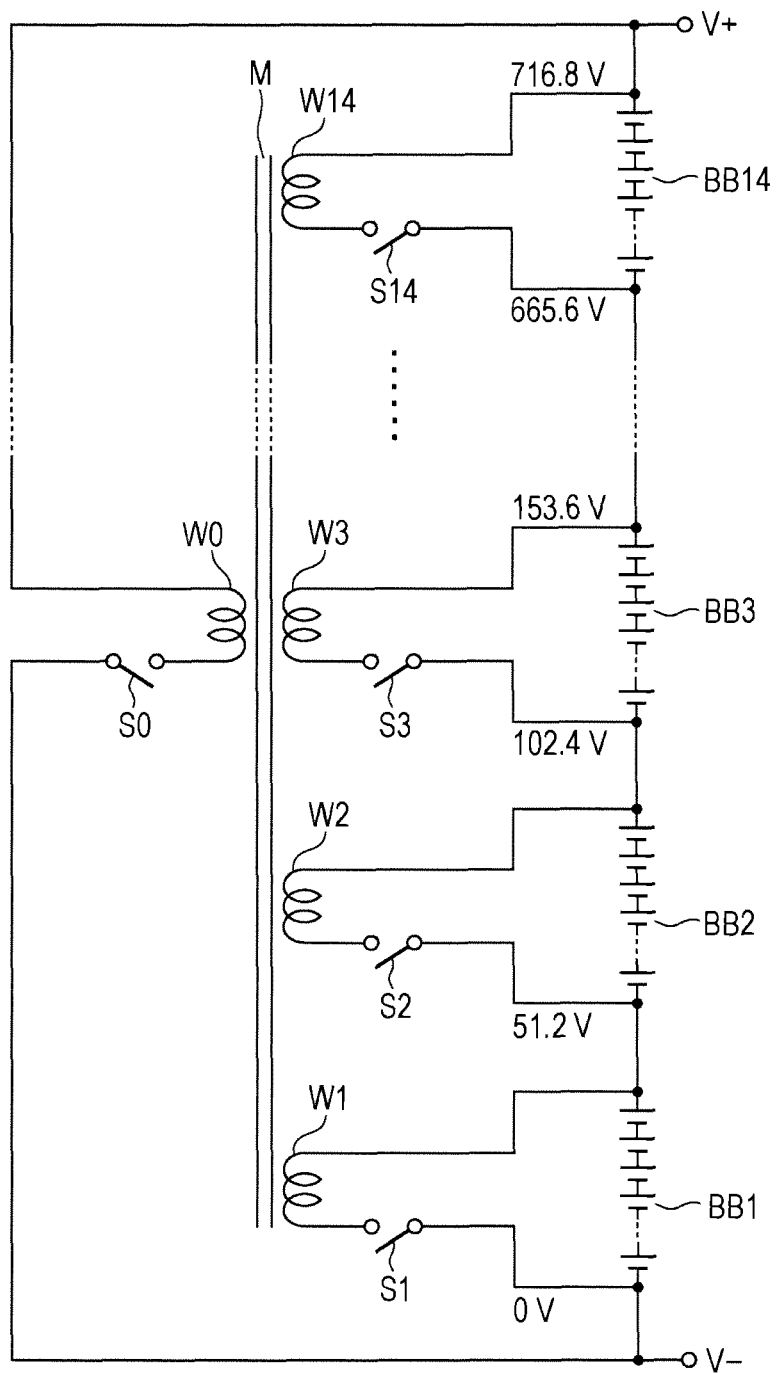
FIG. 19 is a wiring diagram of an exemplary module balancing circuit of the related art.

FIG. 19 illustrates a configuration in which a cell balancing circuit of the related art has been applied as-is to an active module balancing circuit. Balancing is conducted among 14 modules, for example. Battery block groups BB1 to BB14 are connected in series. Each battery block group is configured with eight battery cells connected in parallel and with 16 parallel connections of eight battery cells each (battery blocks) connected in series (referred to as an 8P16S configuration). A single battery block group produces a voltage of 3.2 V $\times$ 16=51.2 V. Consequently, 14 battery block groups BB1 to BB14 connected in series produce a voltage of 51.2 V $\times$ 14=716.8 V.

The cathode and anode of the 14 battery block groups connected in series are connected to both ends of a secondary coil W0. Additionally, a common magnetic core M is provided. A secondary switch S0 is connected in series to the secondary coil W0, and primary switches S1 to S14 are respectively connected in series to primary coils W1 to W14. The switches S0 to S14 are realized with MOSFETs, for example.

Active bottom cell balancing operation with the configuration in FIG. 19 involves switching on the switch S0, magnetizing the magnetic core M due to the current that flows through the secondary coil W0. Next, the primary switch is switched on for the storage module with the lowest voltage, and the battery block group of the corresponding storage module is charged by the electromagnetic energy imparted to its primary coil. As an example, in the case where the voltage of the battery block group BB2 is 32.0 V and the voltage of the other battery block groups is 32.6 V, after the secondary switch S0 has been switched on for a given amount of time, the switch S0 is switched off while the primary switch S2 of the battery block group BB2 is switched on. The battery block group BB2 is charged by the current that flows through the primary coil W2.

Active top cell balancing operation with the configuration in FIG. 19 involves switching on the switch connected to the primary coil of the battery block group with the highest voltage. Next, that switch is switched off while the switch S0 is switched on. Current flows through the secondary coil W0, and the battery block groups BB1 to BB14 are charged. As an example, in the case where the voltage of the battery block group BB2 is 56.5 V and the voltage of the other battery block groups is 55.9 V, after the primary switch S2 has been switched on for a given amount of time, the switch S2 is switched off while the secondary switch S0 is switched on. The battery block groups BB1 to BB14 are charged by the current that flows through the secondary coil W0.

Since the magnetic core M of the transformer is shared in the configuration in FIG. 19, it is difficult to configure it such that a plurality of storage modules, such as 14, are stored in separate cases. In such cases, a transformer apparatus is configured such that a transformer unit including a magnetic core, a coil, and a switch is stored in a separate case from the 14 storage modules, with the 14 storage modules being connected in a star pattern centered about the transformer apparatus. Such a star pattern configuration is problematic in that the star pattern wiring becomes complex if there are many storage modules.

Problems with Module Balancing Circuit of the Related Art

In the configuration in FIG. 19, a voltage of 716.8 V is applied to the series circuit of the secondary coil W0 and the switch S0 by the 14 battery block groups connected in series. When used in practice, a preferable withstand voltage is taken to be approximately three times the applied voltage. Thus, the withstand voltage becomes 2000 V for the FETs or other semiconductor switch element constituting the switch S0. The configuration in FIG. 19, which includes semiconductor switch elements with such withstand voltages, is difficult to realize.

Figure 20:
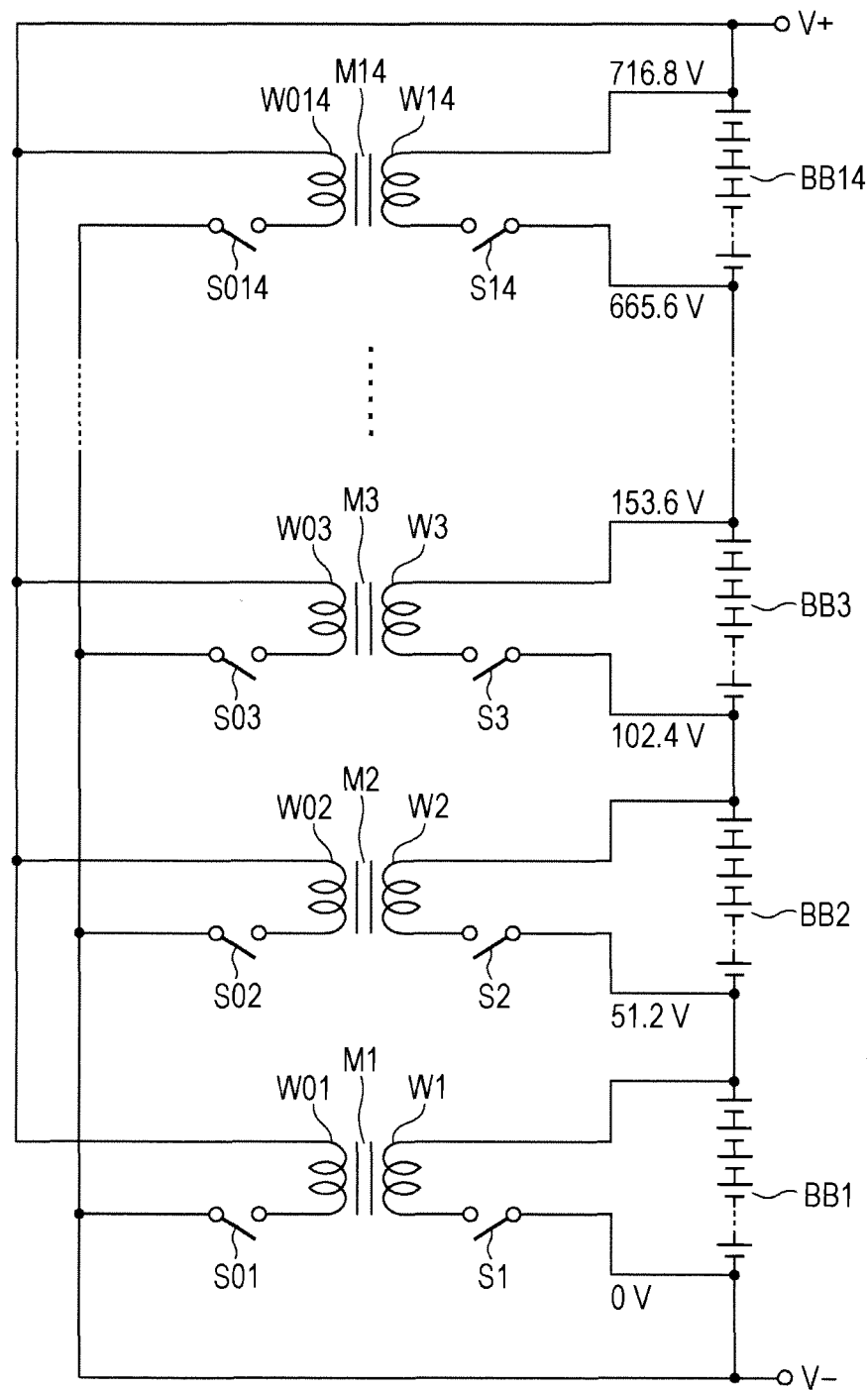
FIG. 20 is a wiring diagram of an exemplary module balancing circuit.

As illustrated in FIG. 20, the magnetic core M may be split into 14 magnetic cores M1 to M14, and the secondary coil W0 may be split into 14 secondary coils W01 to W014. In so doing, the 14 storage modules can be split up and stored in cases. In the configuration in FIG. 20, a voltage of 716.8 V is respectively applied to the primary switches S01 to S014. However, with the configuration in FIG. 20, it is possible to construct flyback transformers separately and respectively connect the primary and secondary switches to the coils for independent control of switching operation. Consequently, as discussed later, it becomes possible to control the parallel retrieval of power from a plurality of battery block groups as well as the parallel supply of power to a plurality of battery block groups. Moreover, the amount of power can be controlled by controlling the length of the on-periods during switching operation.

Module Balancing Circuit According to Disclosure

Figure 21:
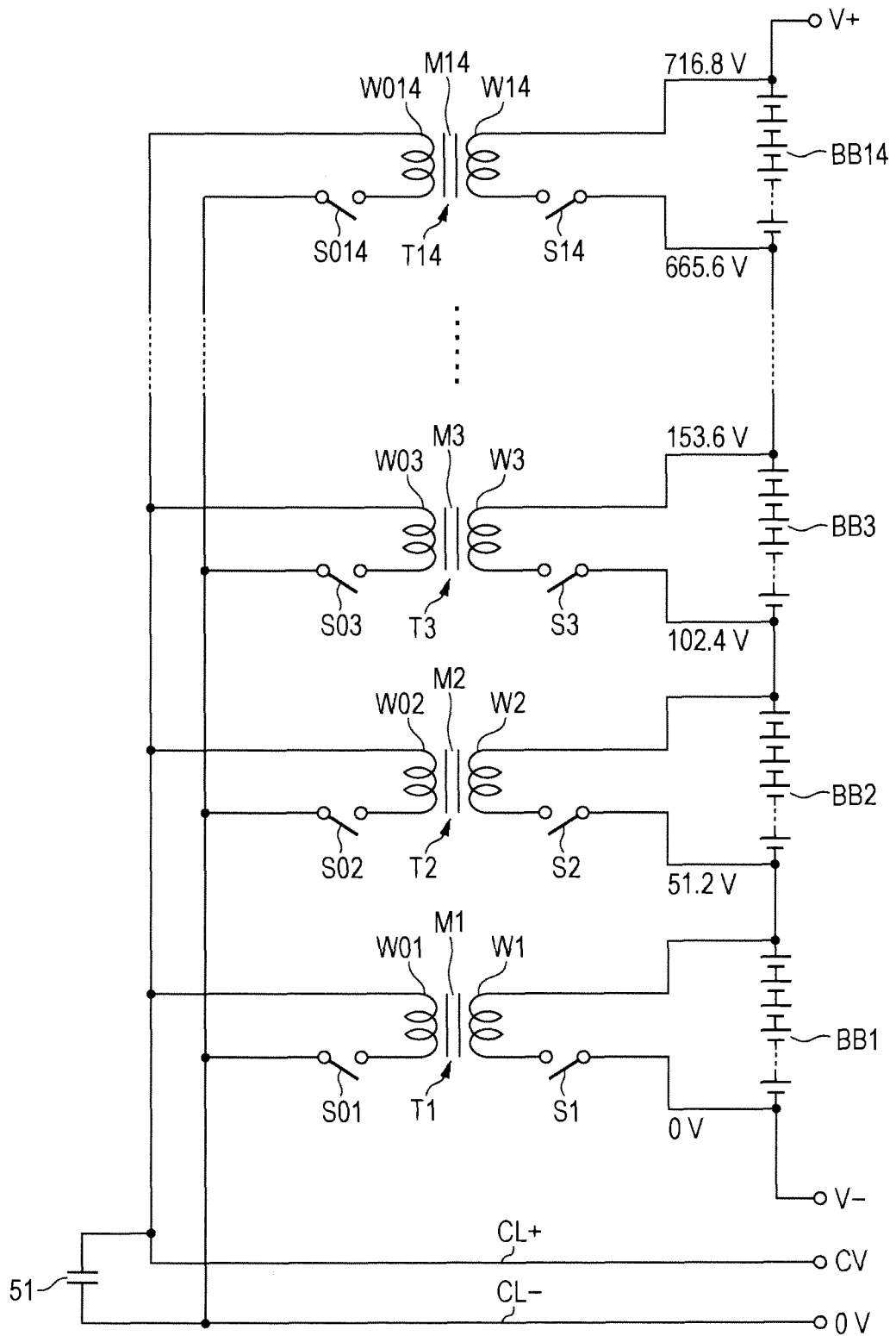
FIG. 21 is a wiring diagram of a first exemplary module balancing circuit of the present disclosure.

As illustrated in FIG. 21, in this disclosure, a flyback transformer T1 includes a primary coil W1, a secondary coil W01, and a magnetic core M1. A switch S1 is connected in series to the primary coil W1, and a switch S01 is connected in series to the secondary coil W01. Flyback transformers T2 to T14 similarly include primary coils W2 to W14, secondary coils W02 to W014, and magnetic cores M2 to M14. Switches S2 to S14 are connected in series to the primary coils W2 to W14. Switches S02 to S014 are connected in series to the secondary coils W02 to W14.

The series circuit of the primary coil W1 and the switch S1 in the flyback transformer T1 is connected to the positive and negative ends of a battery block group BB1 in a storage module. The other respective series circuits of the primary coils W2 to W14 and the switches S2 to S14 are connected to the positive and negative ends of the battery block groups BB2 to BB14 in storage modules.

A storage element 51 is provided, and a common power supply voltage CV is produced by the storage element 51. The common power supply voltage CV is taken to be a lower voltage than the total voltage 716.8 V of the battery block groups connected in series, and is preferably set to a voltage that is approximately ⅓ of the withstand voltage of the secondary switches or less. For example, the common power supply voltage CV may be set to a value approximately equal to the unit voltage (51.2 V) of a battery block group. By controlling the total discharging current and the total charging current, the common power supply voltage CV is controlled at a desired voltage without overvoltage or undervoltage.

The storage element 51 is a battery, capacitor, etc. Due to the storage element 51, one common power supply line CL+ is taken to be at the common power supply voltage CV, while another common power supply line CL− is taken to be a 0V. The other common power supply line CL− is taken to be a separate power supply not connected to the power supply (V−) for the battery block groups of the plurality of storage modules connected in series. However, the common power supply line CL− may be connected to the power supply V−. One end of each of the split secondary coils W01 to W014 is connected to the common power supply line CL+, while the other end of each of split secondary coils W01 to W014 is connected to the common power supply line CL− via the switches S01 to S014.

Figure 22:
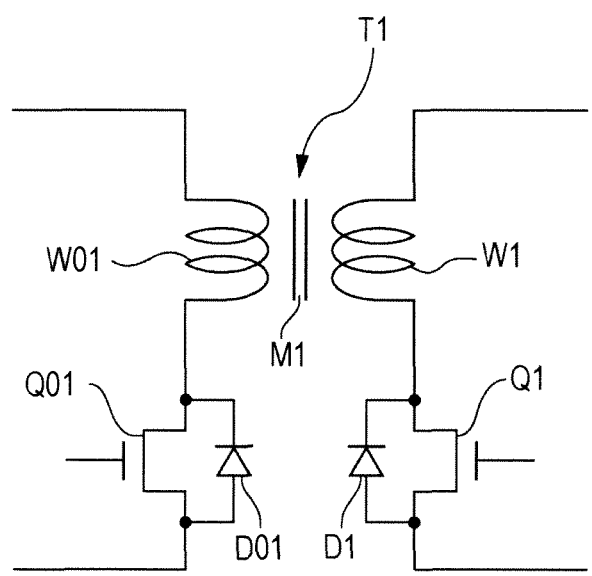
FIG. 22 is a wiring diagram illustrating a specific example of a switch.

The switches S1 to S14 as well as the switches S01 to S014 are realized with MOSFETs, for example. As illustrated in FIG. 22, the switch S01 of the flyback transformer T1 for example includes a MOSFET Q01 with a diode D01 connected between its drain and source, while the switch S1 includes a MOSFET Q1 with a diode D1 connected between its drain and source. Switching on and off is controlled by a control signal from the controller of the control box ICNT. The control box ICNT receives information on voltage monitoring results from the module controller CNT in each storage module, and generates a control signal (pulse signal). However, other semiconductor switch elements besides MOSFETs may also be used, such as IGBTs (Insulated Gate Bipolar Transistors). However, with a switch (including a MOSFET and a diode connected between its drain and source), current automatically flows through the diode in response to current flowing in the source-to-drain direction, even without a control signal (automatic switch-on).

The common power supply voltage CV is applied to the series circuits of the secondary coils W01 to W014 and the switches S01 to S014. For example, by setting the common power supply voltage CV to a voltage similar to the voltage applied to the primary coils and switches (51.2 V), the withstand voltage of the secondary switches S01 to S014 can be taken to be approximately 154 V. Such a withstand voltage is not a particularly high value for the semiconductor switch constituting the secondary switches S01 to S014, making it easier to construct a module balancing circuit.

In each of the flyback transformers T1 to T14, the turns ratio of primary coil versus secondary coil is not limited to one, but the phase is taken to be inverted between primary and secondary. Furthermore, the flyback transformers T1 to T14 are able to bidirectionally transmit power. Consequently, the labeling of "primary" and "secondary" is for the sake of convenience, and it is possible to transmit power both from primary to secondary as well as from secondary to primary.

Taking the flyback transformer T1 as an example, if the switch S1 is switched on from a state where the switches S1 and S01 are off, current flows through the coil W1, magnetizing the magnetic core M1. During the period in which the switch S1 is on, a current that increases with time flows through the coil W1. Next, if the switch S1 is switched off and the switch S01 is switched on, current flows into the coil W01 via the switch S01, since the magnetic core is magnetized. This current is a current that decreases with time. Operation of the other flyback transformers is similar. The flyback transformers function as coupled inductors.

Active bottom cell balancing operation with the configuration in FIG. 21 involves controlling the primary switches to move power from the battery block group with the highest voltage to the storage element 51, and additionally controlling the secondary switches to move power to the battery block group of the storage module with the lowest voltage. In this way, a module balancing circuit according to the disclosure moves power in two stages via bidirectional flyback transformers.

As an example, operation will be described for the case where the voltage of the battery block group BB3 is the highest at 32.6 V, while the voltage of the battery block group BB2 is the lowest at 32.0 V. First, the switch S3 is switched on, and current flows into the primary coil W3 of the flyback transformer T3 with the battery block group BB3 acting as the power supply. Next, the switch S3 is switched off and the switch S03 is switched on. Due to the electromagnetic energy, current flows through the secondary coil W03, charging the storage element 51.

Next, the switch S03 is switched off while the switch S02 is switched on. Due to the storage element 51, current flows through the secondary coil W02 of the flyback transformer T2. Next, the switch S02 is switched off while the switch S2 is switched on. The battery block group BB2 is charged by the current that flows through the primary coil W2. In so doing, active bottom cell balancing operation is achieved.

Active top cell balancing operation with the configuration in FIG. 21 involves controlling the primary switches to move power from the battery block group with the highest voltage to the storage element 51, and additionally controlling the secondary switches to move power to the battery block group of the storage module with the lowest voltage. In this way, a module balancing circuit according to the disclosure moves power in two stages via bidirectional flyback transformers.

As an example, operation will be described for the case where the voltage of the battery block group BB3 is the highest at 56.5 V, while the voltage of the battery block group BB2 is the lowest at 55.9 V. First, the switch S3 of the flyback transformer T3 is switched on, and current flows into the primary coil W3 with the battery block group BB3 acting as the power supply. Next, the switch S3 is switched off and the switch S03 is switched on. Due to the electromagnetic energy, current flows through the secondary coil W03, and the storage element 51 is charged.

Next, the switch S03 is switched off while the switch S02 of the flyback transformer T2 is switched on. Due to the storage element 51, current flows through the secondary coil W02. Next, the switch S02 is switched off while the switch S2 is switched on. The battery block group BB2 is charged by the current that flows through the primary coil W2. In so doing, active top cell balancing operation is achieved.

Figure 23:
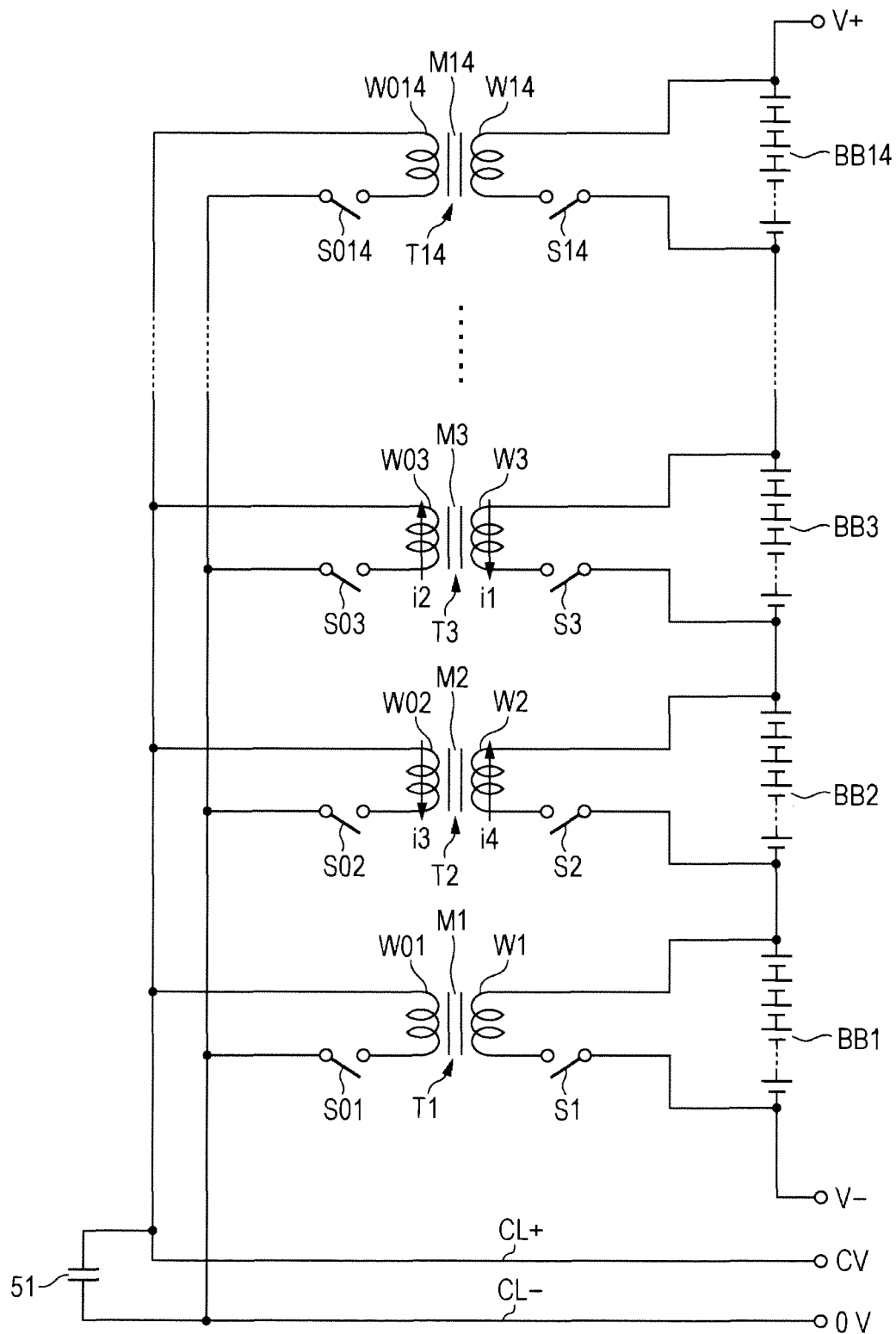
FIG. 23 is a wiring diagram for explaining operation of a first exemplary module balancing circuit of the present disclosure.

Active top cell balancing operation will now be described in further detail with reference to FIGS. 23 and 24A to 24H. As illustrated in FIG. 23, a current that flows through the coil W3 of the flyback transformer T3 is labeled i1, while a current that flows through the coil W03 is labeled i2. The currents i1 and i2 are in antiphase. A current that flows through the coil W02 of the flyback transformer T2 is labeled i3, while a current that flows through the coil W2 is labeled i4. The currents i3 and i4 are in antiphase. Furthermore, assume that the storage element 51 is fully charged when operation commences.

Figure 24:
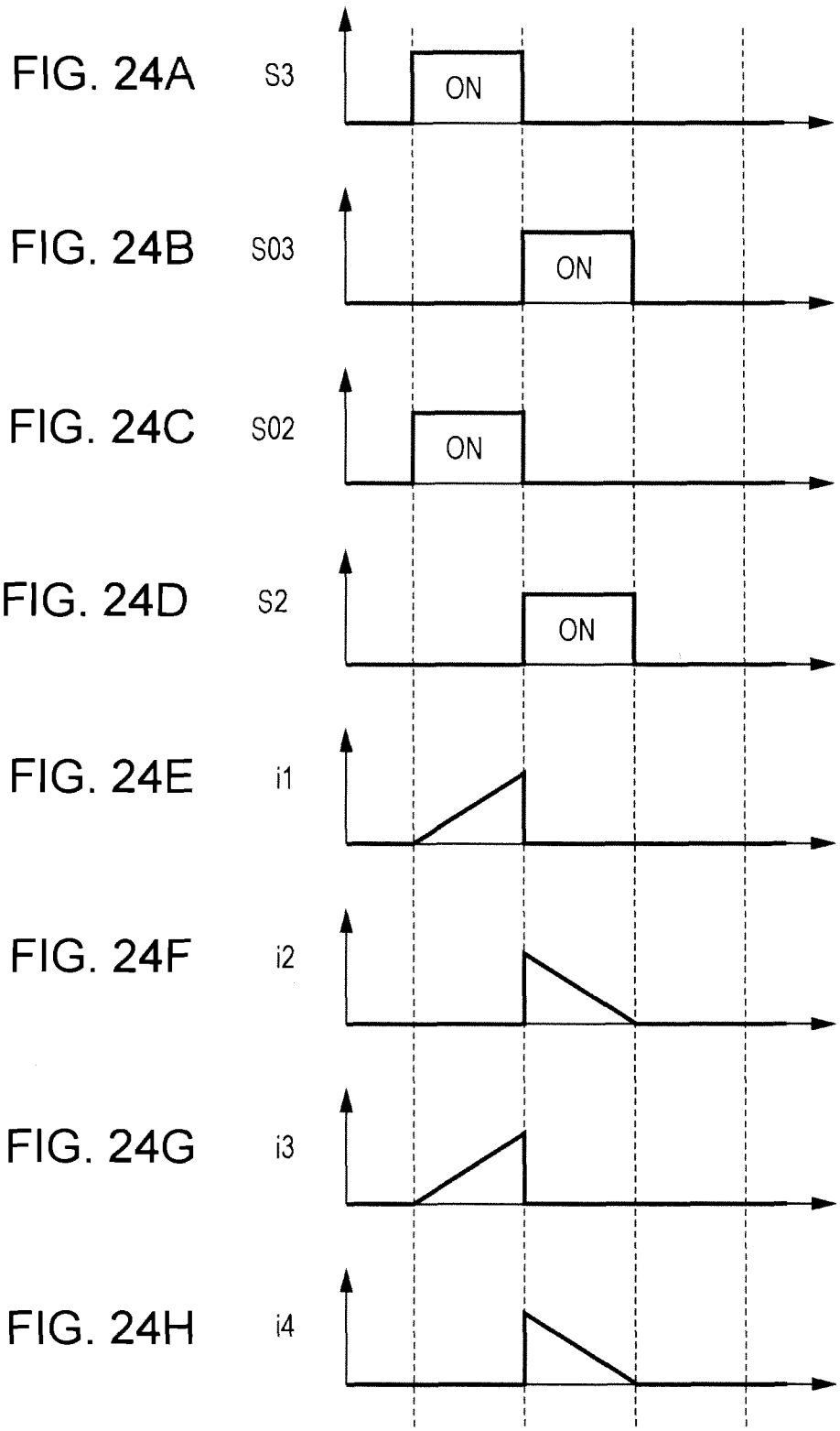
FIGS. 24A to 24H are timing charts for explaining operation of a first exemplary module balancing circuit of the present disclosure.

As illustrated in the timing chart in FIG. 24, power transmission via the flyback transformer T3 and power transmission via the flyback transformer T2 are conducted in parallel. First, the switches S3 and S02 are switched on for the same period, as illustrated in FIGS. 24A and 24C. Switching on the switch S3 causes a gradually increasing current i1 to flow through the coil W3, as illustrated in FIG. 24E. Switching on the switch S02 causes a gradually increasing current i3 to flow through the coil W02, as illustrated in FIG. 24G. The current i3 flows in a discharge direction to the storage element 51.

Next, the switches S3 and S02 are switched off, and the switches S03 and S2 are switched on for the same period, as illustrated in FIGS. 24B and 24D. Switching on the switch S03 causes a gradually decreasing current i2 to flow through the coil W03, as illustrated in FIG. 24F. The current i2 flows in a charging direction to the storage element 51. Due to the charging of the storage element 51 by the current i2, power is moved from the battery block group BB3 to the storage element 51.

Switching on the switch S2 causes a gradually decreasing current i4 to flow through the coil W2, as illustrated in FIG. 24H. The current i4 flows in a charging direction to the battery block group BB2. Due to the charging by the current i4, power in the storage element 51 is moved to the battery block group BB2. Note that in actual power transmission, it is configured such that power is moved a little bit at a time by multiple switching operations rather than a single switching operation. Furthermore, the amount of power to move can be set to a desired amount by applying pulse-width modulation to a pulse signal for a switch to control the switch's on-period. Also, although the switches S3 and S02 are depicted in a synchronized form in FIGS. 24A and 24C, in practice an asynchronous relationship may be acceptable by allowing a given range in the common power supply voltage CV.

Modification of Module Balancing Circuit According to Disclosure

In the above-described module balancing circuit according to the disclosure, it is configured such that power retrieved via a single flyback transformer is moved via a single flyback transformer. However, power may also be retrieved via a plurality of flyback transformers. For example, it may be configured such that power is retrieved from both the storage module with the largest voltage and the storage module with the second-largest voltage. Furthermore, it may also be configured such that retrieved power is moved via a plurality of flyback transformers. For example, it may be configured such that power is supplied to both the storage module with the lowest voltage and the storage module with the second-smallest voltage. For example, with the configuration in FIG. 21 discussed above, power may be retrieved with a small current via the flyback transformer T14, while at the same time retrieving power with a large current via the flyback transformer T3. Additionally, it may be configured such that power is respectively supplied with medium currents via the flyback transformers T1 and T2, contemporaneously with the power retrieval.

Figure 25:
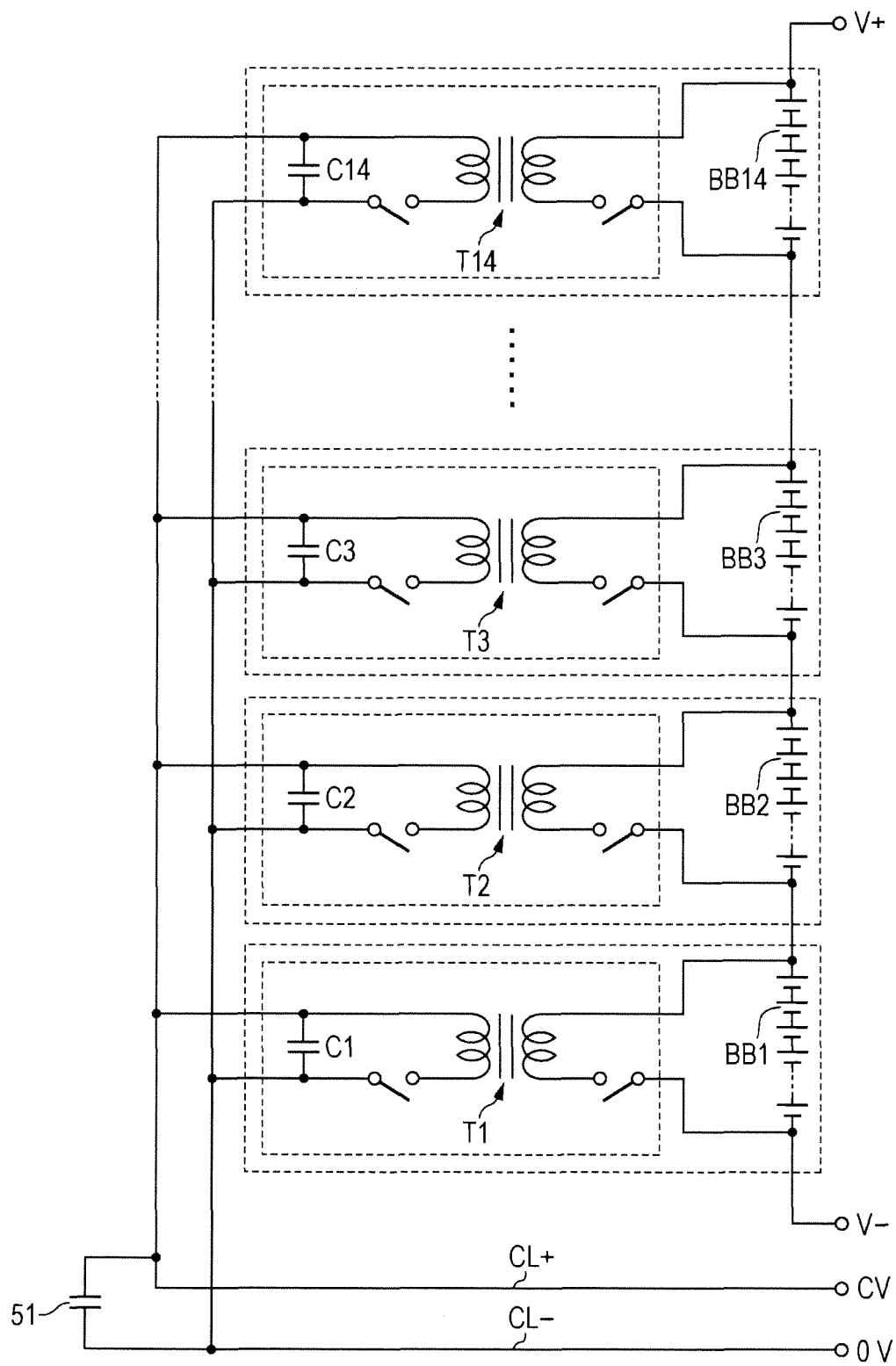
FIG. 25 is a wiring diagram of a second exemplary module balancing circuit of the present disclosure.

As illustrated in FIG. 25, capacitors C1 to C14 are inserted between the common power supply line CL+ and the common power supply line CL− on the secondary side in each of the flyback transformers T1 to T14 of the storage modules. By reducing high-frequency components with the capacitors C1 to C14, voltages produced on the common power supply lines CL+ and CL− can be output as DC (Direct Current) power. It may also be configured such that this DC power is supplied as the power supply for the control box ICNT.

Figure 26:
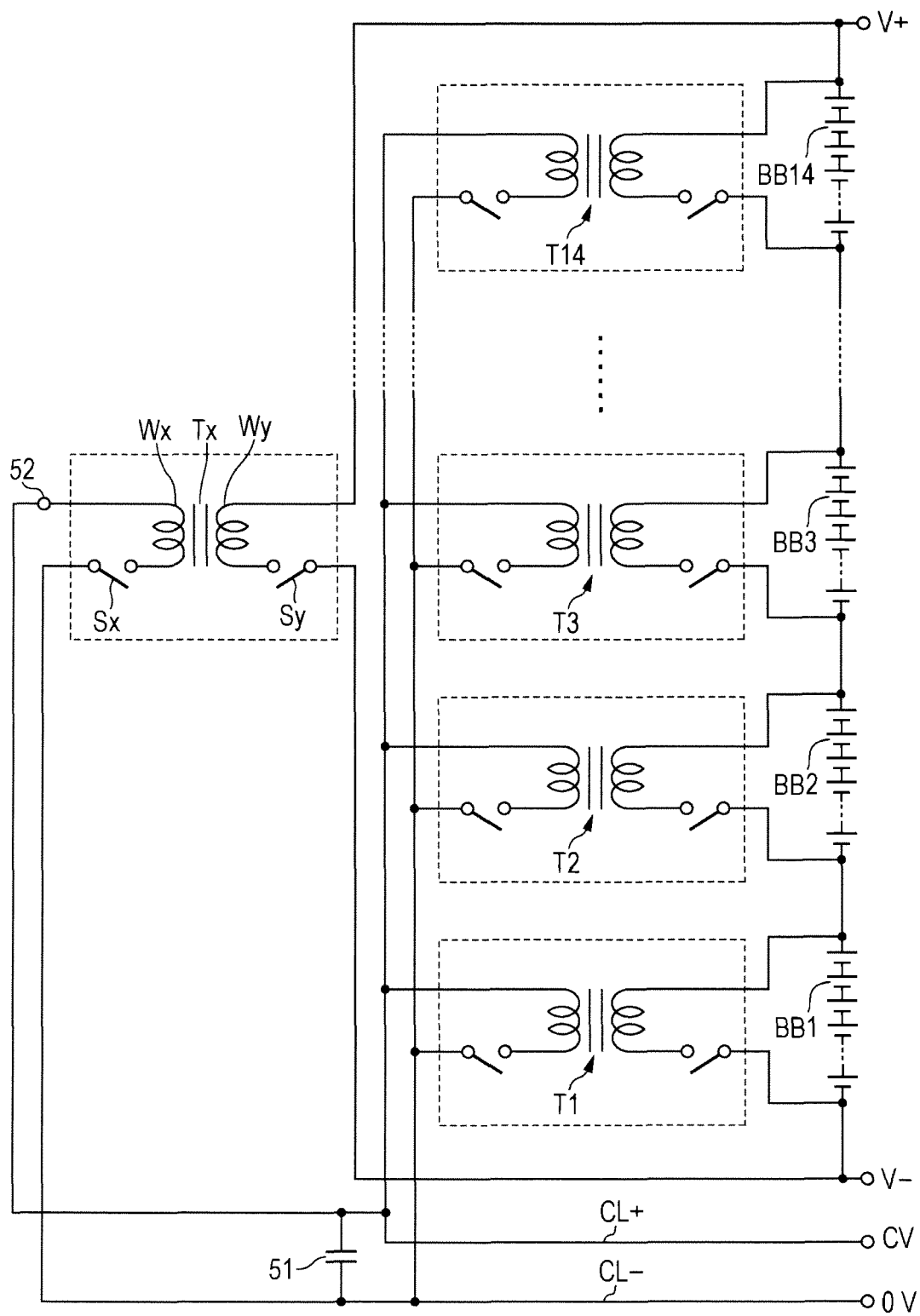
FIG. 26 is a wiring diagram of a third exemplary module balancing circuit of the present disclosure.

Furthermore, as illustrated in FIG. 26, it may be configured such that a common flyback transformer Tx is provided for all storage modules. The flyback transformer Tx includes a primary coil Wy, a secondary coil Wx, and a magnetic core Tx. The coil Wx is connected in series to a switch Sx. The coil Wy is connected in series to a switch Sy. One end of the secondary coil Wx in the flyback transformer Tx is connected to a terminal 52, while the other end is connected to a 0V line via the switch Sx. The terminal 52 is connected to the common power supply voltage CV terminal.

One end of the primary coil Wy is connected to the cathode (V+) of a series connection of battery block groups BB1 to BB14 in a plurality of storage modules, such as 14. The other end of the primary coil Wy is connected to the anode (V−) of the series connection of battery block groups BB1 to BB14. Flyback transformers T1 to T14 and a storage element 51 are connected to the battery block groups BB1 to BB14 similarly to the configuration in FIG. 21, and module balancing like that discussed earlier is conducted.

According to the configuration in FIG. 26, power can be supplied to the battery block groups of all storage modules at once via the flyback transformer Tx, enabling increased variation in module balancing operation.

Furthermore, in this disclosure, it is possible to use a power transmission apparatus based on an electromagnetic coupling technique, such as a forward converter or RCC (Ringing Choke Converter) technique, rather than a flyback converter technique.

Figure 27:
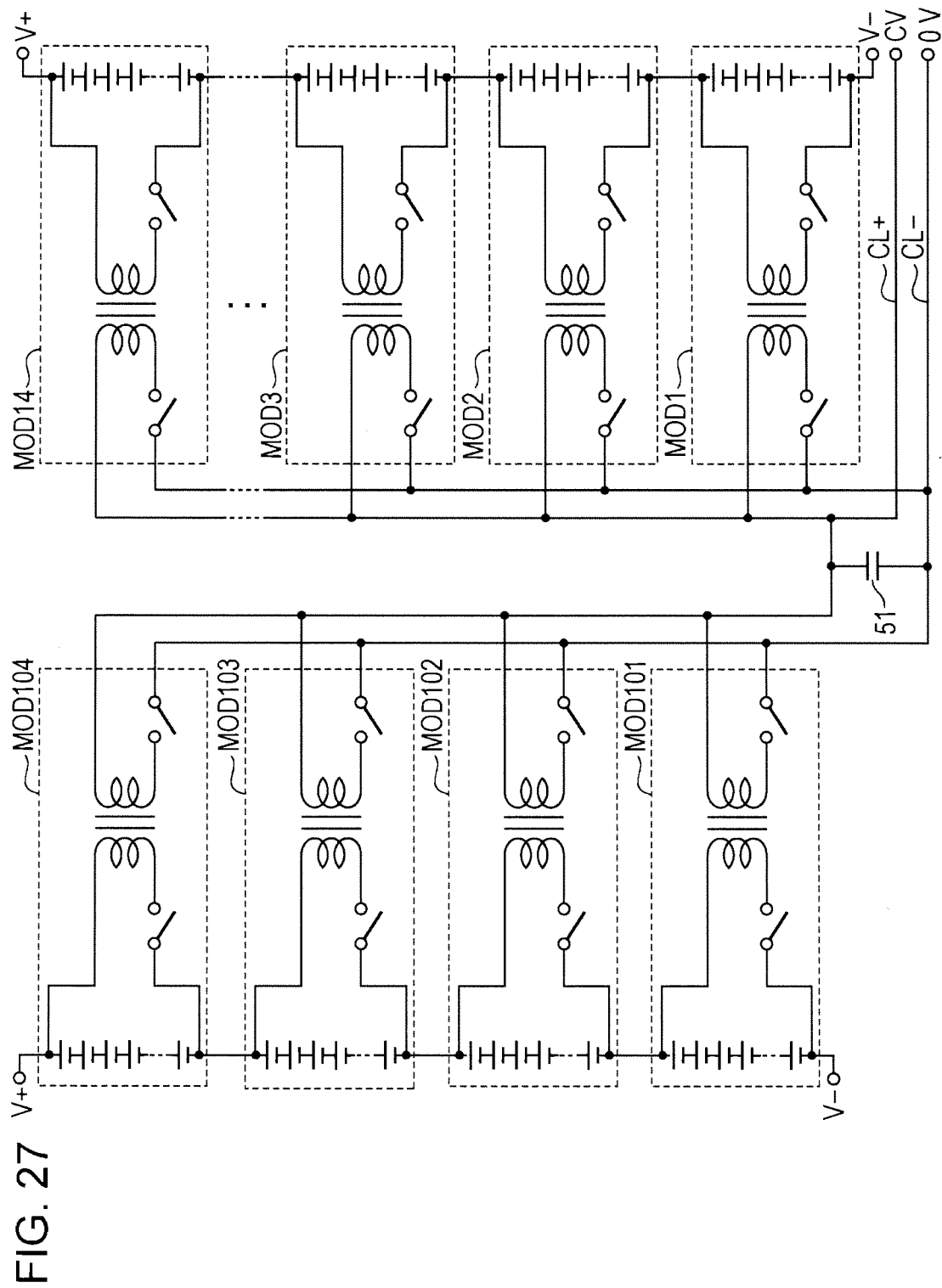
FIG. 27 is a wiring diagram of a fourth exemplary module balancing circuit of the present disclosure.

FIG. 27 illustrates an application of the disclosure, in which the storage modules MOD1 to MOD14 (the configuration illustrated in FIG. 21) are connected to another storage system that includes storage modules MOD101 to MOD104. It is possible to connect the common power supply lines CL+ and CL− to the other storage system if the common power supply voltages CV have an equivalent relationship between the two storage systems. In other words, it is easy to increase the number of connected storage modules.

Figure 28:
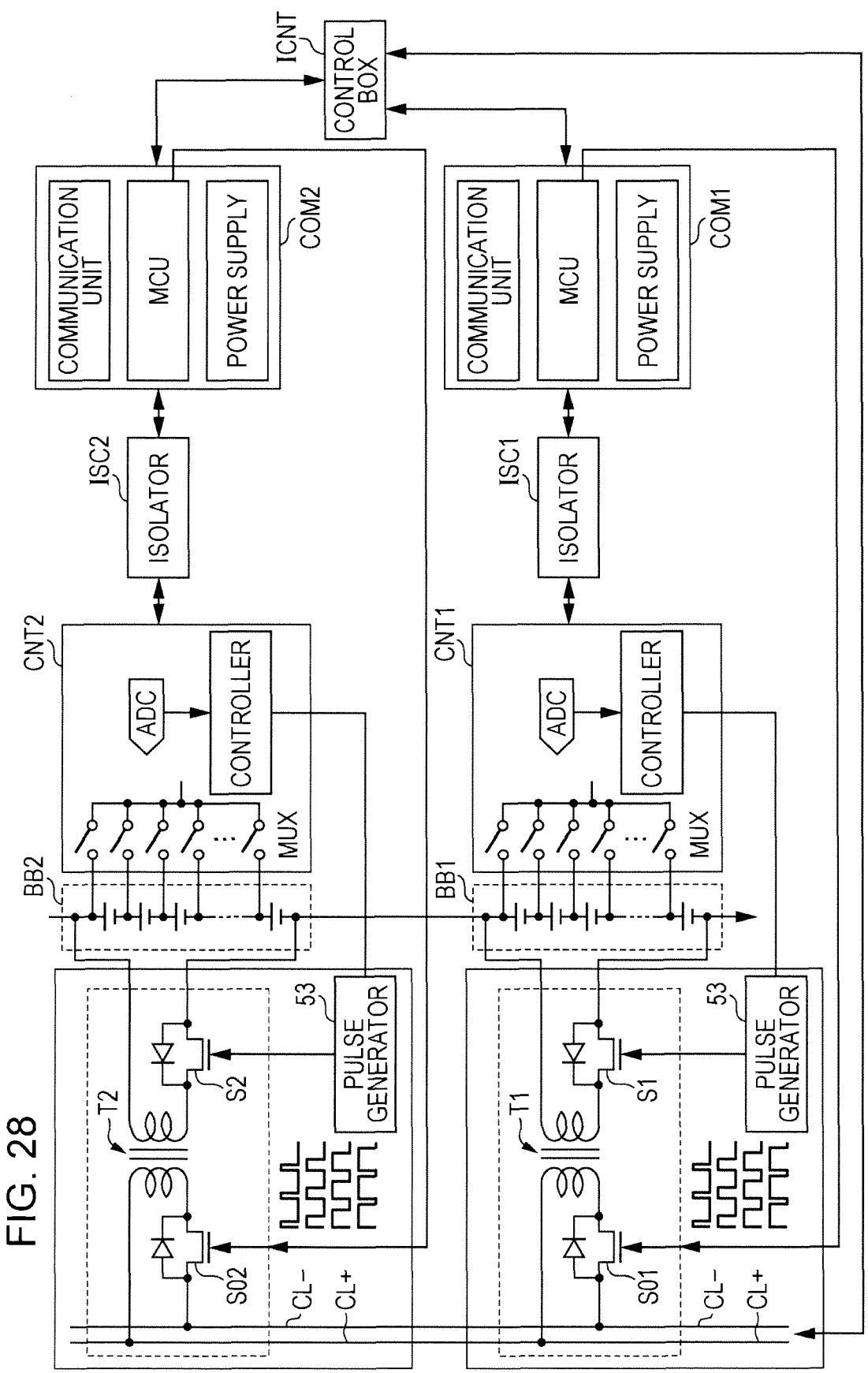
FIG. 28 is a block diagram of a first exemplary storage system including a module balancing circuit of the present disclosure.

FIG. 28 illustrates an exemplary overall configuration of a storage system that includes storage modules, such as storage modules MOD1 and MOD2. Control pulses are supplied from pulse generators 53 to the primary switches (MOSFETs) S1 and S2 of the flyback transformers T1 and T2 in the module balancing circuit discussed earlier. The pulse generators 53 generate control pulses in response to control signals from the module controllers CNT1 and CNT2. For example, the pulse generators 53 may output PWM control pulses. Control pulses are supplied from MCUs (Microcontroller Units) in communication units COM1 and COM2 to the secondary switches (MOSFETs) S01 and S02 of the flyback transformers T1 and T2.

The control box ICNT determines a module balancing sequence from per-module voltage information. Any module balancing charging or discharging is individually relayed to the MCUs in the communication units COM1 and COM2 of the respective modules. The MCUs respectively supply the secondary side of the flyback transformers with control signals directly, or transmit control signals to the primary side of the flyback transformers by isolated communication via isolators ISC.

Control signals are supplied from separate circuit blocks for the primary and secondary sides because of differences in the control signal levels. Also, in parallel with the operation discussed earlier, the control box ICNT measures the voltage between the power supply lines CL+ and CL− supplying the common power supply voltage CV, and applies overall module balancing control such that the common power supply voltage CV becomes a desired voltage.

Advantages of Power Storage Apparatus According to Disclosure

In a module balancing circuit of the disclosure, the flyback transformers in each module are constructed separately, thus enabling simplified wiring without wiring in a star pattern, unlike configurations that share a magnetic core.

In a module balancing circuit of the disclosure, the voltage at either end of a battery block group in each storage module is applied to the primary coil and switch of a flyback transformer, while a common power supply voltage CV is applied to the secondary coil and switch. The common power supply voltage CV is taken to be a value equivalent to the voltage at either end of a battery block group in each storage module, for example. Consequently, there is an advantage in that the voltage of all storage modules connected in series is not applied to the coils and switches, and elements with low withstand voltages can be used for the coils and switches.

In this disclosure, the primary switches S1 to S14 and the secondary switches S01 to S014 of the flyback transformers can be controlled by independent control pulse signals. Consequently, it becomes possible to transmit power via a desired plurality of flyback transformers. Furthermore, by setting the length of the on-periods during switching operation, the amounts of power to move via the flyback transformers can be individually controlled. In other words, the amount of power to move can be varied by lengthening the period during which a switch is switched on in accordance with the amount of power to move.

Additionally, since a large current flows between the output terminals V+ and V− of the plurality of storage modules, a comparatively large amount of noise may be easily produced. However, since the common power supply voltage CV is isolated from the output terminals V+ and V−, the effects of noise due to fluctuations in the load current can be lessened.

A common power supply voltage CV with little influence from noise can be used as the power supply for the control box ICNT. For example, the value of the common power supply voltage CV may be taken to be a value equivalent to the power supply voltage of the controller (such as +5 V or +12 V). When using the common power supply voltage CV as the power supply for the control box ICNT, the power supply for the control box ICNT can be made resilient to voltage fluctuations in the storage modules.

Second Example of Storage System According to the Disclosure

In the first example of a storage system discussed above, isolators ISC1 to ISCn are disposed between the communication units COM1 to COMn and the module controllers CNT1 to CNTn, as illustrated in FIG. 6. However, a second example of a storage system is configured such that the isolators ISC1 to ISCn are disposed between the communication units COM1 to COMn and the control box ICNT, as illustrated in FIG. 29. The isolators ISC1 to ISCn and the control box ICNT are connected by communication lines L1 and L2, and by a power line Lp. An interface such as SPI or CAN is used as the communication interface. Although disposed inside the storage modules MOD1 to MODn in FIG. 29, the isolators ISC1 to ISCn may also be disposed externally to the modules.

Similarly to the first example discussed above, the isolators ISC1 to ISCn function to isolate the communication units COM1 to COMn and the control box ICNT from each other, supply power supply voltage to the communication units COM1 to COMn, and function as a transmission medium for bidirectional communication. The CAN standard, for example, may be used as the protocol for bidirectional communication conducted via the isolators ISC1 to ISCn. Electromagnetic induction, magnetic resonance, or electromagnetic radiation techniques may be used as the technique for power transmission conducted via the isolators ISC1 to ISCn.

Figure 30A:
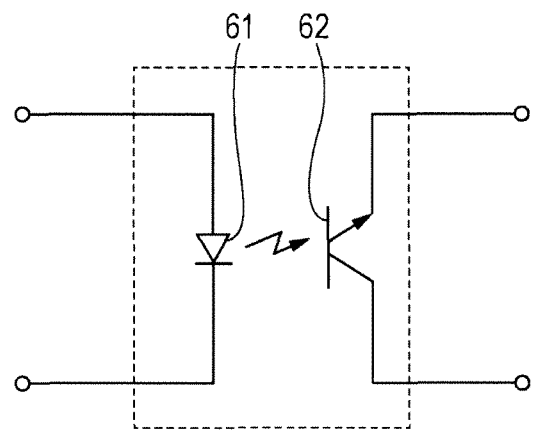
FIG. 30 is a wiring diagram illustrating the circuit layout of another exemplary isolator.
Figure 30B:
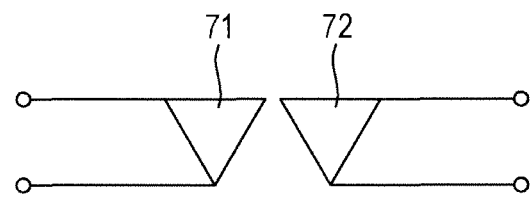

Besides an isolator configuration that uses contactless smart card technology as in the first example discussed above, a photocoupler configuration may also be used, in which changes in light from a photodiode 61 are converted to changes in voltage by a phototransistor 62, as illustrated in FIG. 30A. The photocoupler is used for data transmission. Additionally, a device that conducts wireless communication based on short-range wireless technology may be used, the device including a transmitter device 71 and a receiver device 72, as illustrated in FIG. 30B. Specifically, a technology such as Bluetooth (registered trademark), USB, ZigBee, or NFC may be used. Wireless technologies other than short-range wireless technology may also be used.

Bluetooth (registered trademark) is a short-range wireless technology with a maximum communication range of 100 meters, using the 2.4 GHz frequency band. UWB (Ultra-Wideband) is able to use a very large bandwidth (3.1 GHz to 10.6 GHz) to communicate up to a maximum of 480 Mbps over a distance of approximately 10 meters. ZigBee is a short-range wireless technology being standardized by the ZigBee Alliance. ZigBee uses the 2.4 GHz, 902 to 928 MHz, and 868 to 870 MHz frequency bands, with a maximum communication range from 9 to 69 meters. NFC (Near Field Communication) is a short-range wireless technology in the 13.56 MHz band. NFC standardizes the wireless interface portion of contactless smart card technologies from multiple standards, creating cross-compatibility among contactless smart cards. NFC has been standardized in two stages, and two standards, Type A and Type B, exist. Furthermore, a configuration compatible with a plurality of communication protocols may also be included.

Figure 30C:
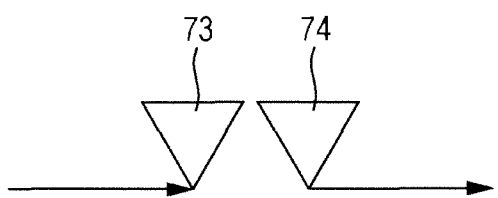

In this disclosure, the isolators ISC1 to ISCn transmit power in addition to communicating data. In order to transmit power, a wireless power transmission protocol between a power transmitter device 73 and a power receiver device 74 utilizing for example magnetic resonance is used, as illustrated in FIG. 30C. A high-frequency signal from a high-frequency power supply is supplied to the power transmitter device 73 via a matching circuit. Connected to the power receiver device 74 are a matching circuit and a rectifier circuit.

Figure 31:
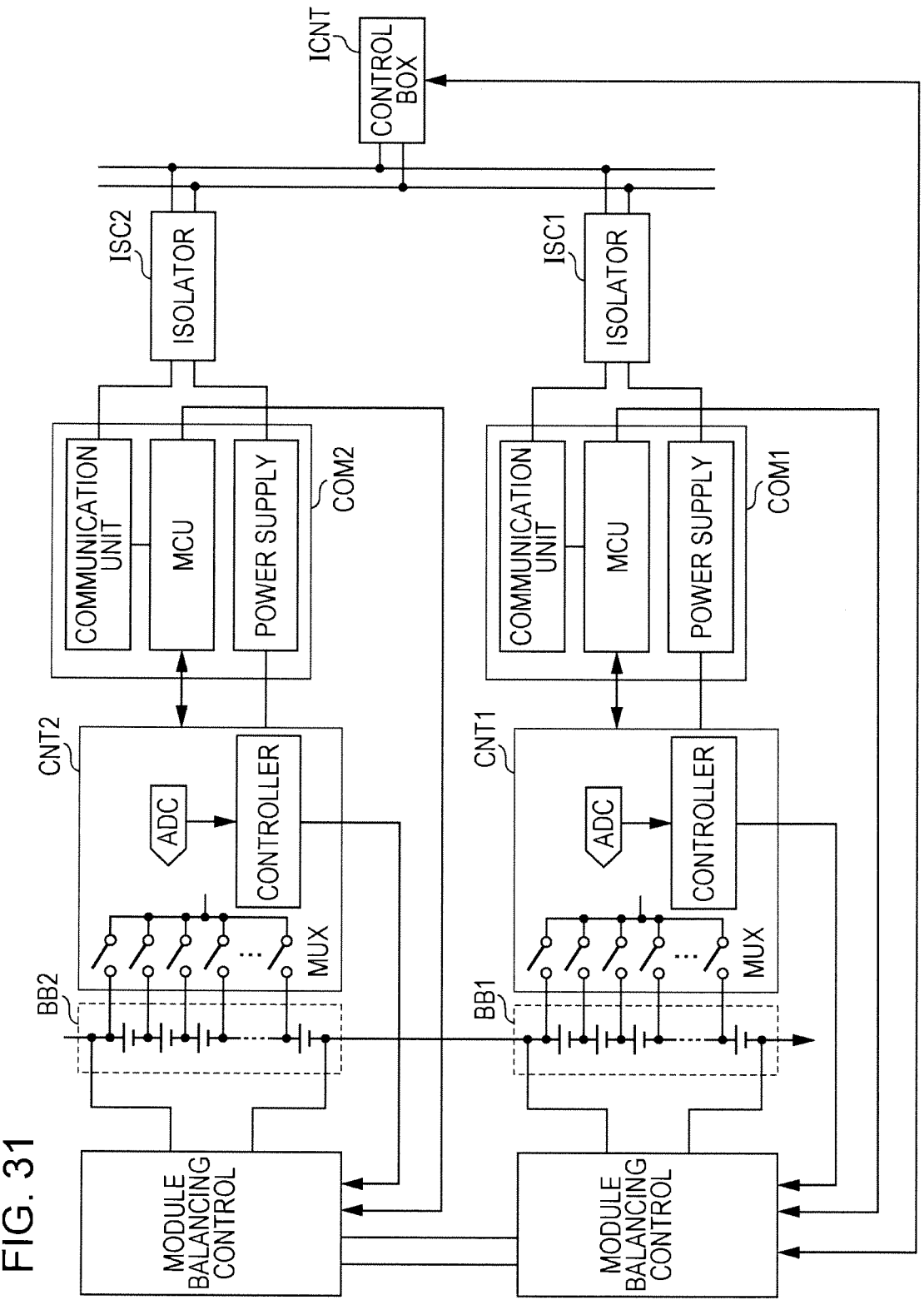
FIG. 31 is a block diagram of a second exemplary storage system including a module balancing circuit of the present disclosure.

FIG. 31 illustrates an exemplary overall configuration of a second example of a storage system that includes storage modules, such as storage modules MOD1 and MOD2. Battery block groups BB1 and BB2 are respectively connected to module balancing circuits. Each module balancing circuit is supplied with a control signal from module controllers CNT1 and CNT2, and a control signal from MCUs (Microcontroller Units) in the communication units COM1 and COM2. The module balancing circuits are controlled similarly as in the configuration illustrated in FIG. 28.

A power supply line and a communication line from the control box ICNT are respectively illustrated as single lines. A connection between the control box ICNT and the communication units COM1 and COM2 is formed via the isolators ISC1 and ISC2, and power is supplied from the control box ICNT to the communication units COM1 and COM2 via the isolators ISC1 and ISC2. The second example of a storage system according to the disclosure likewise exhibits advantages similar to those of the first example discussed above.

Although the foregoing description is for the case in which the disclosure is applied to a module balancing circuit, the disclosure may also be applied to cell balancing. In other words, by respectively substituting the battery block groups BB1 to BB14 with battery cells in the configuration illustrated in FIG. 21 discussed earlier, a cell balancing circuit can be realized. Advantages similar to those of the foregoing module balancing circuit are still obtained in the case of applying the disclosure to a cell balancing circuit.

Figure 32:
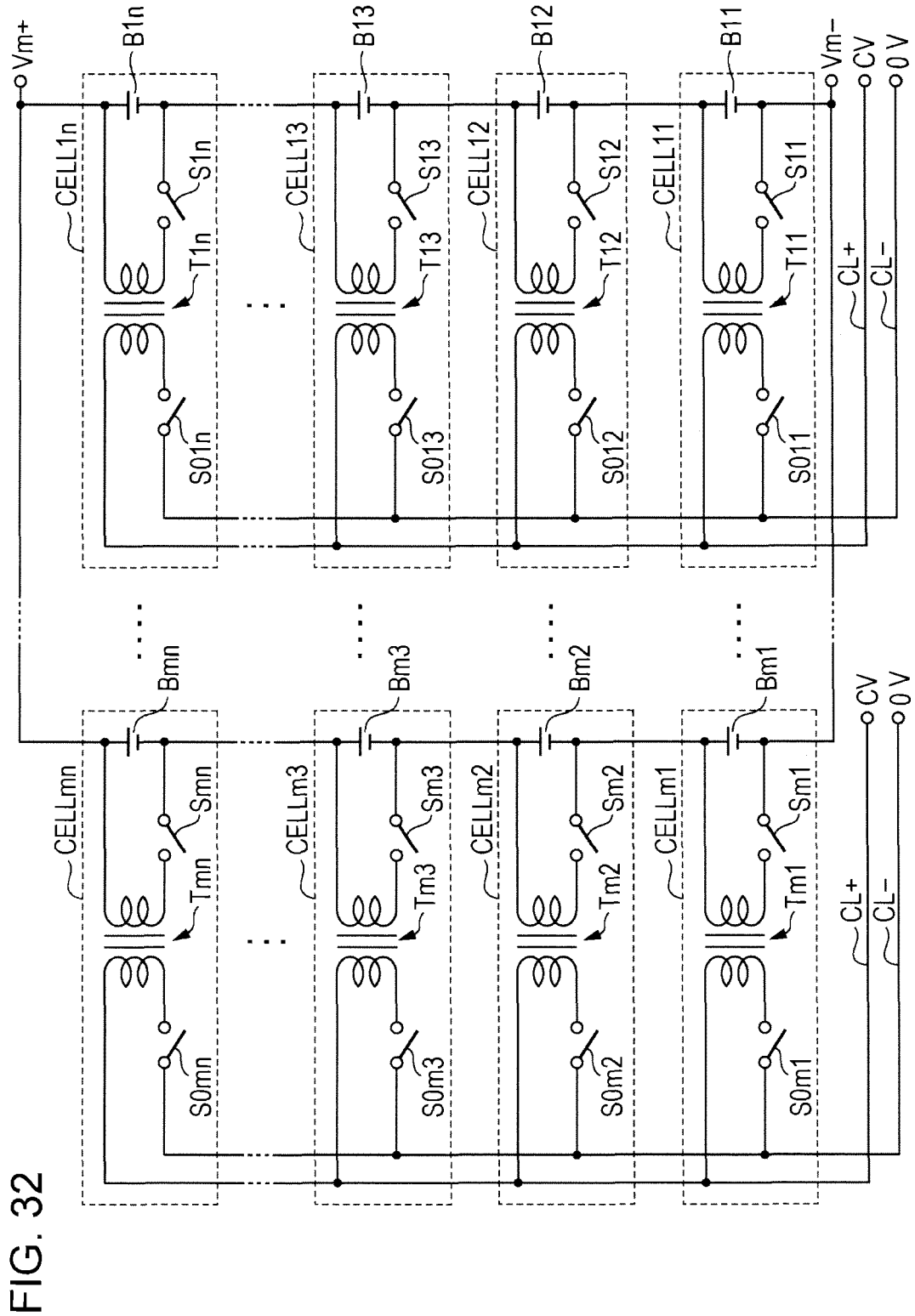
FIG. 32 is a wiring diagram for the case of applying the present disclosure to a cell balancing circuit.

The disclosure can be applied to a cell balancing circuit as illustrated by the typical configuration in FIG. 32. In FIG. 32, n battery cells B11 to B1n are connected in series, and in addition, there are m sets of the battery cells connected in series, with the sets connected in parallel. The primary coils of flyback transformers T11 to T1n and Tm1 to Tmn are connected in parallel to each battery cell, and primary switches S11 to S1n and Sm1 to Smn are connected in series to the primary coils. One end of the secondary coil of each flyback transformer is connected to the power supply line CL+ of a common power supply voltage CV, while the other end of the secondary coil is connected in series to the power supply line CL− of the common power supply voltage CV via respective secondary switches S011 to S01n and S0m1 to S0mn.

Furthermore, the disclosure may take configurations like the following. In an embodiment, a power storage apparatus includes a battery block comprising a plurality of battery cells and an isolating unit that enables wireless information transfer regarding battery information of the battery block. In this embodiment, the battery information includes one of a voltage value, a current value, or a temperature value. In this embodiment the isolating unit includes a first card unit and a second card unit being configured for a contactless smart card protocol to facilitate the wireless information transfer, the first and second card units configured to transmit the battery information wirelessly to each other.

In an embodiment, the isolating unit includes a first antenna mounted on a first trace layer of a printed circuit board and electrically connected to the first card unit and a second antenna mounted on a second trace layer of the printed circuit board and electrically connected to the second card unit, the second antenna being directionally aligned with the first antenna to enable the wireless information transfer of battery information between the first and second antennas. In an embodiment, the contactless smart cart protocol includes Amplitude Shift Keying (ASK) modulation with a carrier wave frequency of about 13.56 MHz at a speed between 212 kbps and 424 kbps, the carrier wave having an amplitude between 2 volts to 13 volts with a 10% degree of modulation.

In an embodiment, the isolating unit enables wireless communication with the battery block via non-contact smart card technology by applying Amplitude Shift Keying (ASK) modulation to a carrier wave frequency between 10 MHz and 20 MHz. In an embodiment, the isolating unit includes a controller area network (CAN) communication protocol to facilitate the wireless information transfer. In an embodiment, wireless information transfer includes transfer via at least one of electromagnetic induction, magnetic resonance, or electromagnetic radiation.

In an embodiment, the power storage apparatus further includes a controller configured to measure battery information of the battery block. In an embodiment, the isolating unit enables wireless power transfer to power the controller. In an embodiment, the isolating unit includes a first antenna mounted on a first trace layer of a printed circuit board and a second antenna mounted on a second trace layer of the printed circuit board, the second antenna being directionally aligned with the first antenna to enable the wireless information transfer of battery information between the first and second antennas.

In an embodiment, the first and second antennas are shaped in linear coil patterns. In an embodiment, the first and second antennas are magnetically coupled through the printed circuit board. In an embodiment, the second antenna is connected in parallel to a resistor and a capacitor to filter the received battery information. In an embodiment, the first trace layer is separated from the second trace layer by at least one insulation layer of the printed circuit board.

In another embodiment, a power storage system includes a first storage module including a first battery block comprising a first plurality of battery cells and a first isolating unit that enables wireless information transfer regarding battery information of the first battery block and a second storage module. In this other embodiment, the power storage system also includes a second battery block comprising a second plurality of battery cells and a second isolating unit that enables wireless information transfer regarding battery information of the second battery block. In this other embodiment, battery information of the first storage module is aggregated with battery information from the second storage module.

In an embodiment, the battery information includes one of a voltage value, a current value, or a temperature value. In an embodiment, each of the first and second isolating units includes a first card unit and a second card unit being configured for a contactless smart card protocol to facilitate the wireless information transfer, the first and second card units configured to transmit the battery information wirelessly to each other.

In an embodiment, the power storage system further includes a managing unit configured to aggregate the battery information of the first storage module with the battery information from the second storage module. In an embodiment, the power storage system further includes a first communication unit included within the first storage module configured to transmit battery information of the first battery block to the managing unit, a first controller included within the first storage module configured to measure the battery information of the first battery block, a second communication unit included within the second storage module configured to transmit battery information of the second battery block to the managing unit, and a second controller included within the second storage module configured to measure the battery information of the second battery block.

In an embodiment, the isolating unit enables wireless power transfer between the first communication unit and the first controller to power the first controller and between the second communication unit and the second controller to power the second controller. In an embodiment, each of the first and second communication units are communicatively coupled to the managing unit via a first wire for bidirectional communication and a second wire for power supply.

In an embodiment, each of the first and second isolating units includes a first antenna mounted on a first trace layer of a printed circuit board and a second antenna mounted on a second trace layer of the printed circuit board, the second antenna being directionally aligned with the first antenna to enable the wireless information transfer between the first and second antennas.

In a further embodiment, a power storage control apparatus includes a battery block comprising a plurality of battery cells, a controller configured to measure battery information of the battery block, and an isolating unit that enables wireless communication with the controller and wirelessly transmits power to the controller. In this further embodiment, the battery information includes one of a voltage value, a current value, or a temperature value. In this embodiment, the isolating unit includes a first card unit and a second card unit being configured for a contactless smart card protocol to facilitate the wireless information transfer, the first and second card units configured to transmit the battery information wirelessly to each other. Also in this embodiment, the isolating unit may include a first antenna mounted on a first trace layer of a printed circuit board and electrically connected to the first card unit and a second antenna mounted on a second trace layer of the printed circuit board and electrically connected to the second card unit, the second antenna being directionally aligned with the first antenna to enable the wireless information transfer between the first and second antennas.

In an embodiment, the power storage control apparatus further includes a second battery block comprising a plurality of battery cells, wherein the controller is additionally configured to measure battery information of the second battery block. In an embodiment, the power storage control apparatus further include a multiplexor communicatively coupled to the controller, the multiplexor configured to switch between the first and second battery blocks to enable the controller to measure battery information of the first battery block separately from battery information of the second battery block and an analog-to-digital converter communicatively coupled to the multiplexor and the controller, the analog-to-digital converter configured to convert analog data associated with the battery information of the first and second battery blocks received via the multiplexor into corresponding digital data for the controller.

In an embodiment, the controller is configured to actively balance a voltage level of the first and second the battery blocks. In an embodiment, the controller is configured to actively balance the voltage of the first and second the battery blocks by determining a difference between a charge potential of the first and second battery blocks and transferring power from the battery block with a greater charge potential to the battery block with a lower charge potential. In an embodiment, the isolating unit is configured to wirelessly provide power to the controller, thereby enabling the controller to operate independent of power stored in the battery block.

In yet another embodiment, a power storage apparatus to power a vehicle includes a plurality of storage modules, each storage module including at least one battery block comprising a plurality of battery cells, a controller configured to measure battery information of the at least one battery block, and an isolating unit that enables wireless communication with the controller and wirelessly transmits power to the controller. In this embodiment, the power storage apparatus also includes an electrical load including an electronic transmission or a motor of a vehicle, the electrical load receiving power from an aggregate of power from the plurality of storage modules.

In an embodiment, the battery information includes one of a voltage value, a current value, or a temperature value. In an embodiment, each of the isolating units includes a first card unit and a second card unit being configured for a contactless smart card protocol to facilitate the wireless information transfer, the first and second card units configured to transmit the battery information wirelessly to each other.

In an embodiment, the power storage apparatus to power the vehicle further includes a managing unit configured to aggregate the battery information and the power from the plurality of storage modules. In an embodiment, the managing unit is configured to actively balance voltage levels of the plurality of storage modules while the electronic transmission or the motor is being used to drive the vehicle.

In an embodiment, the isolating unit is configured with a controller area network (CAN) communication protocol to facilitate the wireless information transfer. In an embodiment, the managing unit is configured to communicate the aggregated battery information with other processors in the vehicle via the CAN communication protocol.

Application in the Form of Home Power Storage System

Figure 33:
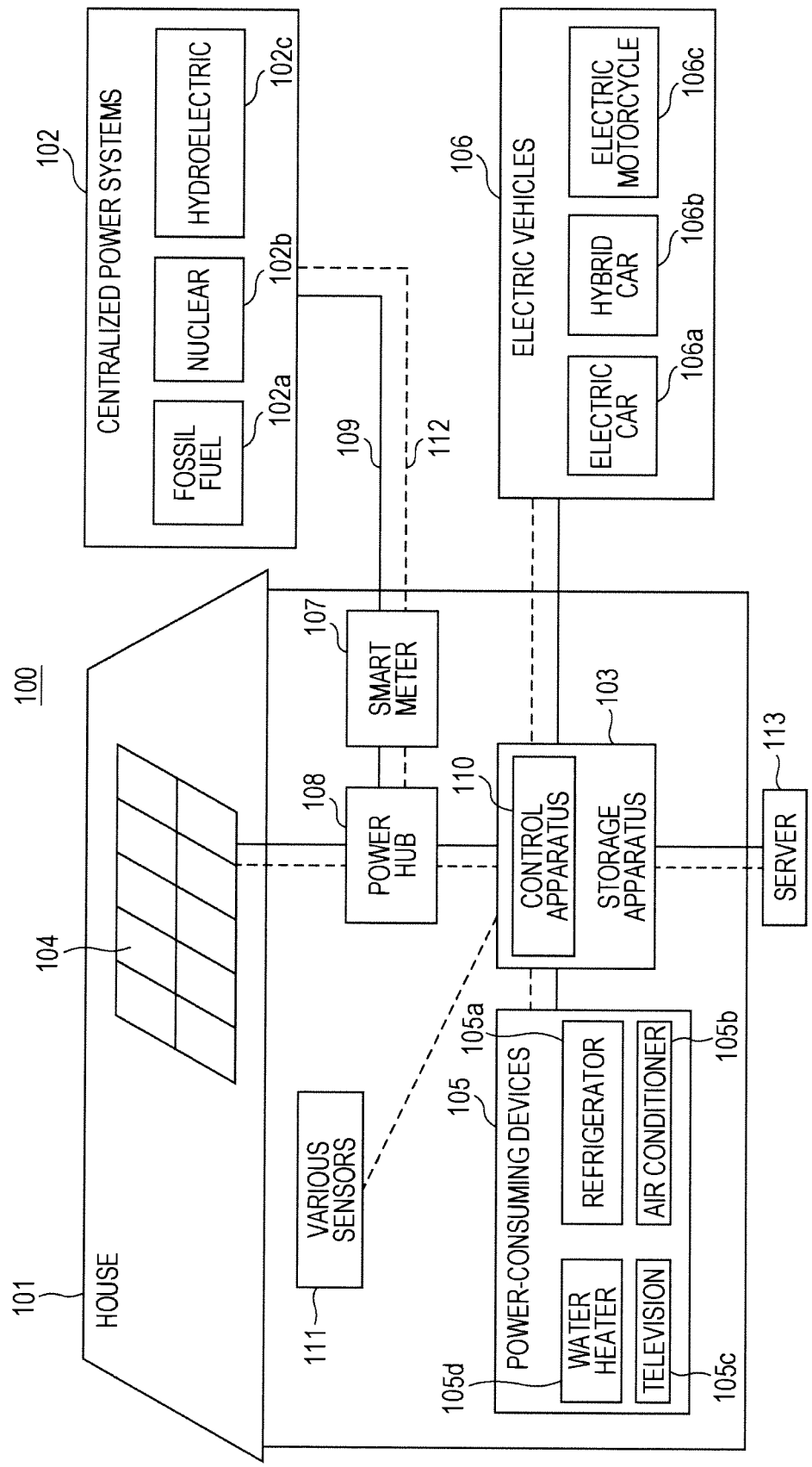
FIG. 33 is a block diagram of a first exemplary application of a storage system including a module balancing circuit of the present disclosure.

An example of applying the disclosure to a home power storage system will now be described with reference to FIG. 33. For example, in the storage system 100 of a house 101, power is supplied from centralized power systems 102 such as fossil-fuel 102a, nuclear 102b, and hydroelectric 102c to a storage apparatus 103 via a power grid 109, an information network 112, a smart meter 107, and a power hub 108, etc. In addition, power from an independent power source such as a home generator 104 is supplied to the storage apparatus 103. Power supplied to the storage apparatus 103 is stored. Power used in the house 101 is supplied by using the storage apparatus 103. The above is not limited to a house 101, and a similar power storage system may also be used for a building.

The house 101 is provided with the generator 104, power-consuming devices 105, the storage apparatus 103, a control apparatus 110 that controls the respective apparatus, a smart meter 107, and sensors 111 that acquire various information. The respective apparatus are connected by the power grid 109 and the information network 112. Solar cells, fuel cells, etc. may be used as the generator 104, with generated power being supplied to the power-consuming devices 105 and/or the storage apparatus 103. The power-consuming devices 105 are a refrigerator 105a, an air conditioner 105b, a television receiver 105c, and a water heater 105d, etc. Additionally, electric vehicles 106 are included among the power-consuming devices 105. The electric vehicles 106 are an electric car 106a, a hybrid car 106b, and an electric motorcycle 106c.

For the storage apparatus 103, a battery unit of the disclosure discussed earlier is applied. The storage apparatus 103 includes secondary batteries or capacitors, and may include a lithium-ion battery, for example. The lithium-ion battery may be stationary or used in the electric vehicles 106. The smart meter 107 is provided with functions for measuring commercial power usage and transmitting the measured usage to a power company. The power grid 109 may involve one of DC power transmission, AC power transmission, or wireless power transmission, or a combination of a plurality of the above.

The various sensors 111 are a motion sensor, illumination sensor, object sensor, power consumption sensor, vibration sensor, contact sensor, temperature sensor, and infrared sensor, etc. Information acquired by the various sensors 111 is transmitted to the control apparatus 110. With information from the sensors 111, the state of the weather, persons, etc. can be ascertained to automatically control the power-consuming devices 105 and minimize energy consumption. Additionally, the control apparatus 110 is able to externally transmit information regarding the house 101 to a power company, etc. via the Internet.

Processes such as power line routing and AC/DC conversion are conducted by the power hub 108. Methods of communication on the information network 112 to which the control apparatus 110 is connected include methods that use a communication interface such as UART (Universal Asynchronous Receiver-Transmitter), and methods that utilize a sensor network according to a wireless communication protocol such as Bluetooth (registered trademark), ZigBee, or Wi-Fi. The Bluetooth protocol is applied to multimedia communication and is able to communicate on one-to-many connections. ZigBee uses the physical layer of IEEE (Institute of Electrical and Electronics Engineers) 802.15.4. IEEE 802.15.4 is the name of a standard for short-range wireless networks called PANs (Personal Area Networks) or WPANs (Wireless PANs).

The control apparatus 110 is connected to an external server 113. The server 113 may be managed by the house 101, a power company, or a service provider. Information transmitted and received by the server 113 may be power consumption information, lifestyle pattern information, power rates, weather information, disaster information, and information regarding power exchanges. Such information may be transmitted and received by a power-consuming device within the home (the television, for example), or by a device outside the home (such as a mobile phone, for example). Such information may also be displayed on a device with display functions, such as a television, mobile phone, or PDA (Personal Digital Assistant), for example.

The control apparatus 110 that controls the respective units is composed of a CPU (Central Processing Unit), RAM (Random Access Memory), and ROM (Read-Only Memory), etc., and is housed inside the storage apparatus 103 in this example. The control apparatus 110 is connected to the storage apparatus 103, the home generator 104, the power-consuming devices 105, the various sensors 111, and the server 113 by the information network 112, and has functions for adjusting the amounts of commercial power usage and power generation, for example. However, the control apparatus 110 may also be provided with other functions besides the above, such as functions for exchanging power on an electricity market.

As above, power from not only centralized power systems 102 such as fossil-fuel 102a, nuclear 102b, and hydroelectric 102c but also generated power from a home generator 104 (solar power, wind power) can be stored in the storage apparatus 103. Consequently, the amount of power sent out externally can be kept constant even if there are fluctuations in the generated power from the home generator 104, or alternatively, it can be controlled such that power is discharged if necessary. For example, one possible usage scenario may involve storing power obtained by solar power in the storage apparatus 103 while also storing nighttime power in the storage apparatus 103 at night when rates are lower, and discharging power stored by the storage apparatus 103 during the daytime when rates are higher.

Also note that while in this example the control apparatus 110 is described as being housed inside the storage apparatus 103, it may also be housed inside the smart meter 107 or have a standalone configuration. Furthermore, the storage system 100 may also be used with respect to a plurality of homes in a housing complex, and may also be used with respect to a plurality of detached homes.

Application in the Form of Vehicular Power Storage System

Figure 34:
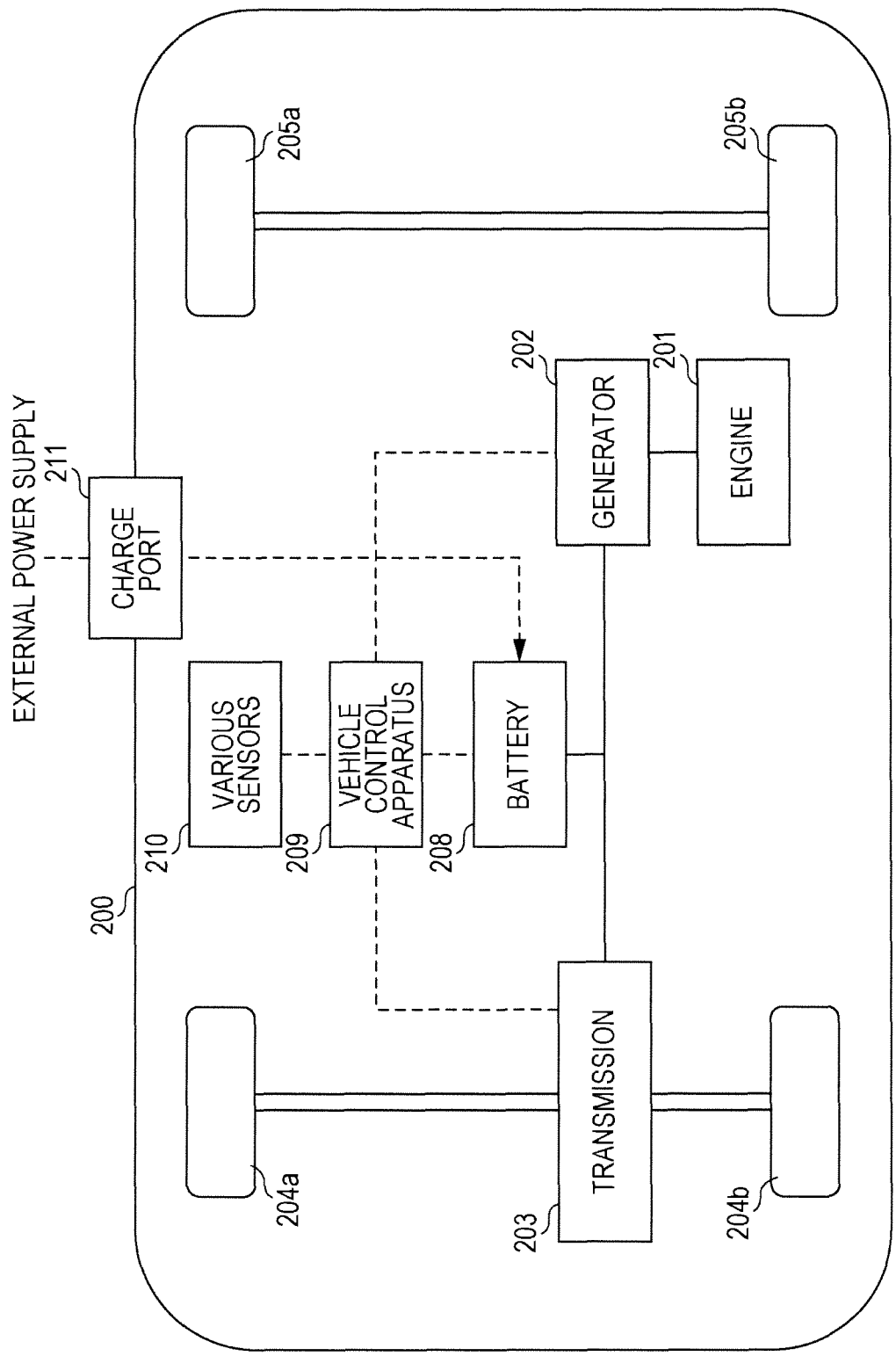
FIG. 34 is a block diagram of a second exemplary application of a storage system including a module balancing circuit of the present disclosure.

An example of applying the disclosure to a vehicular power storage system will now be described with reference to FIG. 34. FIG. 34 schematically illustrates an exemplary configuration of a hybrid vehicle implementing a series hybrid system to which the disclosure has been applied. A series hybrid system is a vehicle running on an electric transmission that uses power generated by a generator driving an engine, or power that has been temporarily stored in a battery.

On board the hybrid vehicle 200 are an engine 201, a generator 202, an electric transmission 203, a drive wheel 204a, a drive wheel 204b, a wheel 205a, a wheel 205b, a battery 208, a vehicle control apparatus 209, various sensors 210, and a charge port 211. The earlier-discussed battery unit of the disclosure is applied as the battery 208.

The hybrid vehicle 200 runs by taking the electric transmission 203 as the source of motive power. A motor is an example of the electric transmission 203. The electric transmission 203 operates on power from the battery 208, with the torque of the electric transmission 203 being transmitted to the drive wheels 204a and 204b. Note that both DC motors and AC motors may be applied as the electric transmission 203 by using an appropriate number of DC-AC or AC-DC conversions. The various sensors 210 control the number of engine revolutions via the vehicle control apparatus 209 and control the position of a throttle valve not illustrated (throttle position). The various sensors 210 include a velocity sensor, acceleration sensor, engine revolution sensor, etc.

Torque from the engine 201 is imparted to the generator 202, and it is possible to store power generated by the generator 202 due to the torque in the battery 208.

When the hybrid vehicle is made to decelerate by a control mechanism not illustrated, the resistance during the deceleration is added to the electric transmission 203 as torque, and the regenerative power generated by the electric transmission 203 due to the torque is stored in the battery 208.

By connecting to a power source external to the hybrid vehicle, the battery 208 is able to receive supplied power from the external power source with the charge port 211 acting as inlet, and is also able to store received power.

Although not illustrated, an information processing apparatus that performs information processing related to vehicle control on the basis of secondary battery-related information may also be provided. Such an information processing apparatus may be an information processing apparatus that displays the remaining battery charge level on the basis of information related to the remaining charge level of the battery, for example.

Herein, the foregoing describes by way of example a series hybrid car running on a motor that uses power generated by a generator driven by an engine or power therefrom which has been temporarily stored in a battery. However, this disclosure is validly applicable to parallel hybrid cars that take the output of both an engine and a motor as sources of motive power and appropriately switch usage among the three modes of running on the engine only, running on the motor only, and running on the engine and the motor. Furthermore, this disclosure is validly applicable to electric vehicles, which run on the drive provided by a driving motor only, without using an engine.

Modifications

Although the foregoing describes specific embodiments of the disclosure, the foregoing embodiments are not limiting, and various modifications based on the technical ideas in this disclosure are possible. For example, the configurations, methods, processes, shapes, materials, and values, etc. given in the foregoing embodiments are merely examples, and different configurations, methods, processes, shapes, materials, and values, etc. may be used as appropriate.

Moreover, it is possible to combine together the configurations, methods, processes, shapes, materials, and values, etc. of the foregoing embodiments insofar as such combinations do not depart from the principal matter of the disclosure.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The application is claimed as follows:

1. A power storage apparatus comprising:
a plurality of battery blocks connected in series, each battery block comprising a plurality of battery cells;
a controller configured to measure battery information of the battery blocks and balance voltages based on the battery information by first balancing the voltages of the battery blocks independent of the plurality of the battery cells and then balancing the voltages of the plurality of battery cells within the battery blocks; and
an isolating unit that enables wireless information transfer regarding the battery information of the battery blocks.

2. The power storage apparatus according to claim 1, wherein the battery information includes one of a voltage value, a current value, or a temperature value.

3. The power storage apparatus according to claim 1, wherein the isolating unit includes a first card unit and a second card unit being configured for a contactless smart card protocol to facilitate the wireless information transfer, the first and second card units configured to transmit the battery information wirelessly to each other.

4. The power storage apparatus according to claim 3, wherein the isolating unit includes:
a first antenna mounted on a first trace layer of a printed circuit board and electrically connected to the first card unit; and
a second antenna mounted on a second trace layer of the printed circuit board and electrically connected to the second card unit, the second antenna being directionally aligned with the first antenna to enable the wireless information transfer of battery information between the first and second antennas.

5. The power storage apparatus according to claim 3, wherein the contactless smart cart protocol includes Amplitude Shift Keying (ASK) modulation with a carrier wave frequency of about 13.56 MHz at a speed between 212 kbps and 424 kbps, the carrier wave having an amplitude between 2 volts to 13 volts with a 10% degree of modulation.

6. The power storage apparatus according to claim 3, wherein the isolating unit enables wireless communication with at least one of the battery blocks via non-contact smart card technology by applying Amplitude Shift Keying (ASK) modulation to a carrier wave frequency between 10 MHz and 20 MHz.

7. The power storage apparatus according to claim 1, wherein the isolating unit includes a controller area network (CAN) communication protocol to facilitate the wireless information transfer.

8. The power storage apparatus according to claim 1, wherein wireless information transfer includes transfer via at least one of electromagnetic induction, magnetic resonance, or electromagnetic radiation.

9. The power storage apparatus according to claim 1, wherein the controller is configured to balance a voltage of a first battery block with a voltage of a second battery block.

10. The power storage apparatus according to claim 9, wherein the isolating unit enables wireless power transfer to power the controller.

11. The power storage apparatus according to claim 1, wherein the isolating unit includes:
a first antenna mounted on a first trace layer of a printed circuit board; and
a second antenna mounted on a second trace layer of the printed circuit board, the second antenna being directionally aligned with the first antenna to enable the wireless information transfer of battery information between the first and second antennas.

12. The power storage apparatus according to claim 11, wherein the first and second antennas are shaped in linear coil patterns.

13. The power storage apparatus according to claim 12, wherein the first and second antennas are magnetically coupled through the printed circuit board.

14. The power storage apparatus according to claim 11, wherein the second antenna is connected in parallel to a resistor and a capacitor to filter the received battery information.

15. The power storage apparatus according to claim 11, wherein the first trace layer is separated from the second trace layer by at least one insulation layer of the printed circuit board.

16. A power storage system comprising:
a first storage module including:
a first battery block comprising a first plurality of battery cells; and
a first isolating unit that enables wireless information transfer regarding battery information of the first battery block; and
a second storage module including:
a second battery block comprising a second plurality of battery cells; and
a second isolating unit that enables wireless information transfer regarding battery information of the second battery block;
wherein the battery information of the first storage module is aggregated with the battery information from the second storage module to first balance a voltage of the first storage module with a voltage of the second storage module, and wherein the battery information of at least one of the first and second storage modules is then used to balance a voltage of at least one of the first plurality of battery cells and the second plurality of battery cells.

17. A power storage apparatus to power a vehicle comprising:
a plurality of storage modules, each storage module including:
at least one battery block comprising a plurality of battery cells;
a controller configured to measure battery information of the at least one battery block and use the battery information to first balance a voltage of the storage module with a voltage of another storage module and to then balance a voltage of the plurality of battery cells; and
an isolating unit that enables wireless communication with the controller and wirelessly transmits power to the controller; and
an electrical load including an electronic transmission or a motor of a vehicle, the electrical load receiving power from an aggregate of power from the plurality of storage modules.

18. The power storage system according to claim 16, wherein the first storage module and the second storage module are connected in series.

19. The power storage system according to claim 16, wherein the controller is configured to use the battery information to balance the voltage of the first storage module with the voltage of the second storage module and then to balance the voltages of each of the first plurality of battery cells and the second plurality of battery cells.

20. The power storage apparatus according to claim 17, wherein the plurality of storage modules are connected in series.

21. The power storage apparatus according to claim 17, wherein the controller is configured to use the battery information to balance the voltage of the storage module with the voltage of the other storage module and then to balance the voltages of the plurality of battery cells within each storage module.

22. The power storage apparatus according to claim 1, wherein the isolating unit enables the wireless information transfer of the battery information using about a 13.56 MHz band.

23. The power storage system according to claim 16, wherein the first isolating unit and the second isolating unit enable the wireless information transfer of the battery information using about a 13.56 MHz band.

24. The power storage apparatus according to claim 17, wherein the isolating unit enables the wireless information transfer of the battery information using about a 13.56 MHz band.

25. The power storage apparatus according to claim 1, wherein the controller balances the voltages of the plurality of battery cells within the each of the battery blocks independently of the other blocks.

26. The power storage system according to claim 16, wherein the voltages of the first plurality of battery cells are balanced independently of the voltages of the second plurality of battery cells.

27. The power storage apparatus according to claim 17, wherein the voltages of the plurality of battery cells are balanced independently of the voltages of battery cells of the another storage module.

* * * * *